(12) United States Patent
Zitting et al.

(10) Patent No.: US 7,370,866 B2
(45) Date of Patent: May 13, 2008

(54) SLEEVE ELEMENT HAVING A BIASABLE END REGION, APPARATUS INCLUDING SAME, AND METHOD OF USE

(75) Inventors: Daniel K. Zitting, St. George, UT (US); Lorin K. Zitting, Centennial Park, AZ (US)

(73) Assignee: Macrotech Polyseal, Inc., Salt Lake City, UT (US)

( * ) Notice: Subject to any disclaimer, the term of this patent is extended or adjusted under 35 U.S.C. 154(b) by 16 days.

(21) Appl. No.: 10/757,774

(22) Filed: Jan. 15, 2004

(65) Prior Publication Data

US 2005/0156383 A1    Jul. 21, 2005

(51) Int. Cl.
*B60T 11/236*      (2006.01)
(52) U.S. Cl. ...................... 277/436; 277/467
(58) Field of Classification Search ............... 277/435, 277/467, 472, 460, 449, 468, 436
See application file for complete search history.

(56) References Cited

U.S. PATENT DOCUMENTS

| | | | |
|---|---|---|---|
| 2,825,590 A * | 3/1958 | Sutherland ................... | 277/589 |
| 3,097,893 A | 7/1963 | White | |
| 3,198,531 A * | 8/1965 | Brenneke .................... | 277/451 |
| 3,814,445 A * | 6/1974 | Bitzan ......................... | 277/589 |
| 3,920,252 A | 11/1975 | Dechavanne | |
| 3,990,712 A | 11/1976 | Dechavanne | |
| RE31,005 E * | 8/1982 | Prasse et al. ................ | 277/446 |
| 4,484,512 A | 11/1984 | Dechavanne | |
| 4,813,343 A | 3/1989 | Schaefer | |
| 4,877,257 A * | 10/1989 | Ide .............................. | 277/466 |
| 5,050,892 A * | 9/1991 | Kawai et al. ................ | 277/436 |
| 5,149,107 A * | 9/1992 | Maringer et al. ........... | 277/556 |
| 5,450,783 A * | 9/1995 | Binford ....................... | 92/208 |

(Continued)

FOREIGN PATENT DOCUMENTS

DE      75 35 535 U1      4/1977

(Continued)

OTHER PUBLICATIONS

Military Standardization Handbook, Plastics, Nov. 1, 1965.*

(Continued)

*Primary Examiner*—Patricia Engle
*Assistant Examiner*—Gilbert Lee
(74) *Attorney, Agent, or Firm*—Traskbritt

(57) ABSTRACT

A sleeve element having at least one end region configured to be biased into a laterally adjacent recess formed in one of a piston element surface and a bore surface is disclosed. A seal assembly is disclosed including two sleeve elements, each sleeve element having at least one end region disposed adjacent a recess formed in one of the piston element surface and the bore surface, the at least one end region being configured for deflection thereinto. A seal assembly including one sleeve element, wherein the sleeve element includes end regions thereof, each end region disposed adjacent a recess formed in one of the piston element surface and the bore surface, the end region being configured for deflection thereinto is also disclosed. Further, an energizer may be disposed generally within a recess. Pressure relief and equalization structures for a sleeve element and seal assembly are also disclosed, as is a method of sealing.

58 Claims, 13 Drawing Sheets

U.S. PATENT DOCUMENTS 6,176,492 B1 * 1/2001 Sawai .................. 277/461
6,397,987 B1 * 6/2002 Pesch et al. ........... 188/322.22
6,595,524 B1    7/2003 Zitting

FOREIGN PATENT DOCUMENTS

DE       44 11 006 A1    12/1994
GB       726809          3/1955

OTHER PUBLICATIONS

PCT International Search Report, mailed Mar. 21, 2005, with Written Opinion of the International Searching Authority.
English language translation of German Patent No. DE 44 11 006 A1 (cited in Supp. IDS filed Apr. 4, 2005).

* cited by examiner

SLEEVE ELEMENT HAVING A BIASABLE END REGION, APPARATUS INCLUDING SAME, AND METHOD OF USE

BACKGROUND OF THE INVENTION

1. Field of the Invention

The present invention relates generally to machine elements that move relative to one another and to seals and bearing surfaces between such machine elements. More particularly, at least one of a sealing and a bearing function may be performed by way of a sleeve element according to the present invention.

2. State of the Art

Seals are conventionally used in maintaining a substance, such as a fluid or gas, located in one area or zone from communicating with another area or zone while allowing relative movement between two or more mechanical components. Typically, one of the mechanical components may traverse through both of the areas or zones. Such seals may also be used in keeping contaminants, such as dirt, dust, or other particulate-type materials, from becoming positioned in an area where one mechanical component moves relative to the surface of another mechanical component. Otherwise, repeated movement between the mechanical components, in combination with the presence of contaminants, may cause damage to the surfaces of the one or more mechanical components as well as to sealing elements.

One common example of mechanical components that move with respect to one another is a piston and bore. For instance, a piston may have an outer surface that is complementary and generally coaxial with the inner surface of a bore in which the piston moves axially, with or without rotation. It is usually desirable that no fluid flow communicate around the piston, so that pressure within the bore may cause the piston to move. Moreover it is also preferred that the piston remain relatively centered within the bore, to prevent the surfaces of the piston and the bore from contacting one another.

Accordingly, in conventional approaches, a piston may be often provided with a seal that prevents leakage, a separate bearing or guide to maintain the relative position of the piston within the bore, and a scraper to remove contaminants on the surface of the bore to inhibit damage to the piston, bore, or sealing elements. More specifically, a separate T-cap seal assembly and a separate wear guide or bearing element may be conventionally employed in piston designs. Also, as will be appreciated by those of ordinary skill in the art, the ability to maintain adequate lubrication between two relatively movable machine components, as well as the ability to limit contaminants from entering between the two relatively movable machine components, greatly enhances the working efficiency of the machine components and also greatly reduces wear of such components, to increase the usable life thereof.

Although the conventional configuration performs as intended, the conventional designs require numerous separate components to form a bearing surface and sealing element between relatively movable machine components. Therefore, in view of the shortcomings in the art, it would be advantageous to provide an improved seal configuration.

BRIEF SUMMARY OF THE INVENTION

In accordance with one aspect of the invention, a sleeve element for sealing against a bore surface is provided. The sleeve element may include a substantially annular body including an inner surface, an outer surface, a first end region, and a second end region. Further, the sleeve element may be configured so that the inner surface may be disposed about an outer periphery of a piston element. The sleeve element may also include at least one sealing feature formed on the outer surface of the substantially annular body. The sealing feature may be sized and configured to sealingly engage against the bore surface.

Moreover, at least a portion of the first end region of the substantially annular body of the sleeve element may be configured to be biased into an adjacent first recess formed in the periphery of the piston element in response to contact between the outer surface of the substantially annular body and the bore surface. Alternatively, both the first end region and second end region of the substantially annular body of the sleeve element may be configured to be biased into a first recess and a second recess in the periphery of the piston element, respectively. In addition, at least a portion of the outer surface of the substantially annular body may be configured as a bearing surface and may be further configured to conformally contact the bore surface disposed therearound.

Accordingly, a sleeve element of the present invention may provide a fluid seal and a bearing surface between two relatively movable machine parts. The sleeve element preferably comprises a substantially continuous annulus comprising a relatively rigid, resilient material. For example, a sleeve element of the present invention may be formed from a material that exhibits about 2% or more resilient elongation including polyamide, polytetrafluoroethelene (PTFE), acetal, polyethelene, polyurethane, or other materials.

Also, the sleeve element of the present invention may be configured to be mechanically constrained about the outer periphery of the piston element to provide fluid sealing between the piston element and a bore surface. Specifically, the sleeve element may be disposed between retention flanges formed on the exterior surface of the piston element that have a lateral extent that exceeds the lateral extent of the inner surface of the sleeve element. Further, the inner surface of the sleeve element may be sized to interferingly engage the outer periphery of the piston element about which it is disposed.

Also, a resilient energizer or energizers carried by the piston element may be used to seal against a portion of the inner surface of a sleeve element of the present invention by way of contact therewith. A resilient energizer or energizers carried by the piston element may also support, bias, or both support and bias the sealing feature of a sleeve element of the present invention. Because a resilient energizer may provide relatively effective sealing as well as support, in accordance with another aspect of the invention, a preferentially acting pressure relief structure may allow for pressure between the inner surface of the sleeve element and the outer surface of the piston to be relieved, which may prevent damage to the sleeve element. Such a pressure relief structure may include protrusions or grooves formed on the surface of an energizer.

Further, the sleeve element of the present invention may be assembled with at least one other component to form a seal assembly. A first embodiment of the sleeve assembly may include a piston element having an outer periphery including a first recess and a second recess wherein a first sleeve element and a second sleeve element may be disposed thereabout. The first sleeve element may include a sealing feature disposed upon the outer surface thereof and the second sleeve element may include a sealing feature disposed upon the outer surface thereof. Additionally, the first end region of the first sleeve element may be laterally adjacent to the first recess and the first end region of the second sleeve element may be laterally adjacent to the second recess. Laterally, as used herein, generally means a direction in relation to a central axis, however, when applied to a cylindrical body or surface, laterally corresponds to a radial direction.

In a second embodiment of a seal assembly of the present invention, a single sleeve element of the present invention may be employed. More particularly, the second embodiment of the present invention includes a piston element having an outer periphery about which the sleeve element may be disposed about the outer periphery of the piston element. The sleeve element may include a first sealing feature and a second sealing feature, each sealing feature being formed on the outer surface thereof. Further, the first end region of the sleeve element may be laterally adjacent to the first recess and the second end region of the sleeve element may be laterally adjacent to the second recess.

As described above, at least a portion of an end region of the sleeve element may be configured to be biased laterally into an adjacent first recess formed in the periphery of the piston element in response to contact between the outer surface of the substantially annular body and the bore surface. Alternatively, both end regions of the sleeve element may be configured to be biased laterally into corresponding recesses formed within the piston element.

Furthermore, the present invention contemplates that a sleeve element comprising a substantially annular body may be positioned within a bore surface and configured to seal against a surface of a piston element in the form of a rod or other cylindrical shaft. Specifically, a sleeve element may include one or more sealing features that are oriented laterally inwardly, as well as a bearing surface that is oriented laterally inwardly.

For instance, at least a portion of a first end region of the substantially annular body of the sleeve element may be configured to be biased into an adjacent first recess formed in the bore surface in response to contact between the outer surface of the piston and the sleeve element. Also, a second end region of the substantially annular body of the sleeve element may be configured to be biased into a second recess formed in the bore surface. At least a portion of the inner surface of the substantially annular body may be configured as a bearing surface and may be further configured to conformally contact the outer surface of the piston element disposed therein. Also, the outer diameter of the sleeve element may be sized to interferingly engage the bore surface. Therefore, a sleeve element of the present invention may be formed from a material that exhibits about 2% or more resilient compression or deformation. Further, the sleeve element may be disposed between retention flanges formed in the bore surface. Of course, such a configuration may include one or more of pressure relief, pressure equalization, and energizer features as described in relation to other embodiments of the present invention.

Put another way, generally, the present invention contemplates a sleeve element including one or more sealing features and having at least a first end region that is disposed laterally adjacent to a recess formed in at least one of a piston element and a bore surface. Sealing assemblies including more than one sleeve element, energizers, pressure relief features, and pressure equalization features may be employed.

In accordance with another aspect of the invention, a method of sealing a sleeve element in relation to a bore surface disposed is disclosed. Particularly, a piston element having a periphery including a recess may be provided and a sleeve element disposed thereabout may also be provided. Further, a bore surface may be disposed about the sleeve element wherein the bore surface biases at least a portion of the first end region of the sleeve element into the recess. The bore surface may also sealingly engage the sealing feature of the sleeve element.

Of course, any of the first sleeve element, the second sleeve element, the first recess, and the second recess of the present invention may each be sized and configured to promote a selected amount of deflection of an end region within a corresponding recess. Also, the sleeve element as well as a selected amount of deflection may be configured to adjust the force on the sealing element or the shape of the sleeve element. Particularly, bending an end region of a sleeve element of the present invention may cause the sleeve element to assume a cross-sectional arcuate or parabolic shape, to bias the bearing surface toward the bore surface or the outer surface of a piston element. Such a configuration may be suited to position or bias the piston element with respect to the bore surface.

BRIEF DESCRIPTION OF THE SEVERAL VIEWS OF THE DRAWINGS

The foregoing and other advantages of the present invention will become apparent upon review of the following detailed description and drawings in which.

DETAILED DESCRIPTION OF THE INVENTION

Figure 1A:
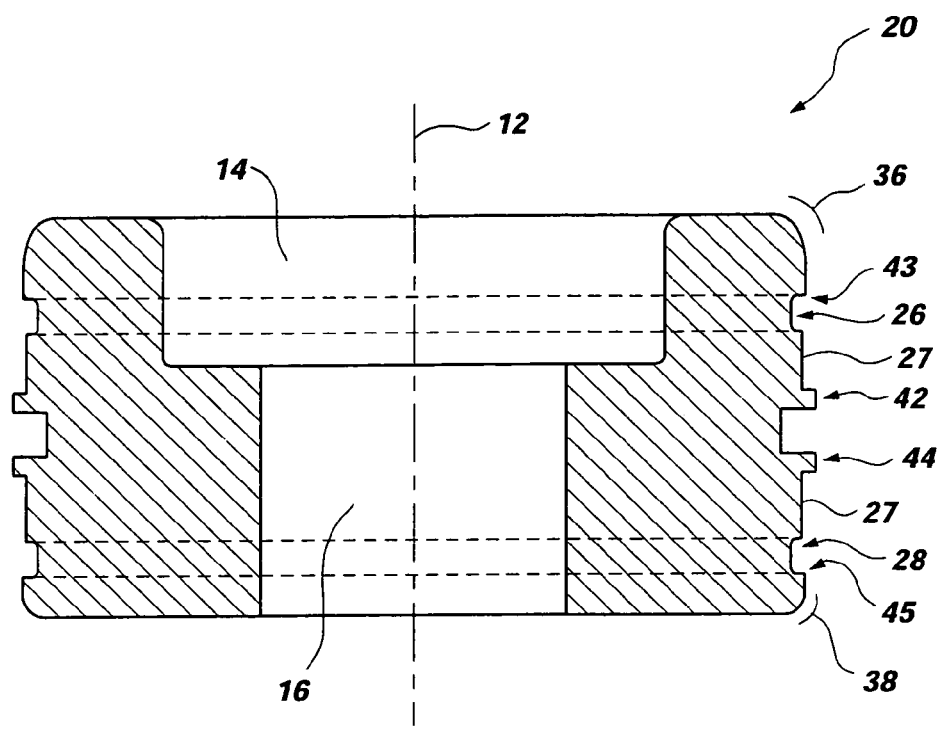
FIG. 1A shows a cross-sectional view of an exemplary embodiment of a piston element of the present invention.

FIG. 1A shows a cross-sectional view of an exemplary piston element 20 of the present invention, generally comprising an annular body disposed symmetrically about longitudinal axis 12. As shown in FIG. 1A, piston element 20 includes rounded upper end 36 and rounded lower end 38. Further, piston element 20 includes recesses 26 and 28 formed therein, as well as retention flanges 42, 43, 44, and 45, as shown in FIG. 1A. Retention flanges 42, 43, 44, and 45 may extend laterally in excess of the lateral extent of outer surface 27 of the piston element 20. As stated above, laterally, as used herein, generally means a direction in relation to a central axis, however, when applied to a cylindrical body or surface, laterally corresponds to a radial direction. Of course, the present invention contemplates that a piston element may comprise other body geometries, such as generally elliptical, generally square, or as otherwise known in the art.

Further, piston element 20 may also include internal recesses 14 and 16 for affixing other mechanical components thereto.

Figure 1B:
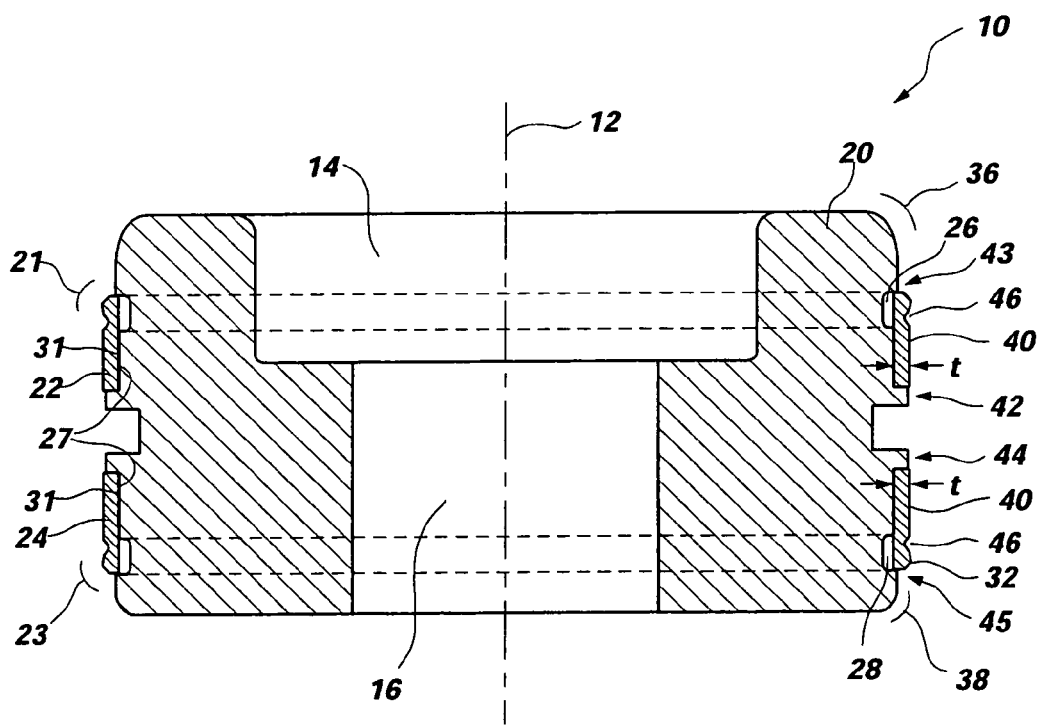
FIG. 1B shows a cross-sectional view of an exemplary embodiment of a seal assembly of the present invention.

FIG. 1B shows a cross-sectional view of an exemplary seal assembly 10 of the present invention wherein sleeve elements 22 and 24 are positioned about piston element 20. Generally, seal assembly 10 may be disposed within a bore surface 50 (FIGS. 1D and 1E) to operate as a movable assembly therein. Further, sleeve elements 22 and 24 may each also include bearing surface 40, sealing feature 32, and depression 46. Thus, sleeve elements 22 and 24 may each provide a bearing surface and a sealing surface during operation of the seal assembly 10 as a movable assembly. Such a configuration may provide a robust, effective, and easily implementable sealing and bearing mechanism for mechanical components that move with respect to one another.

Sleeve elements 22 and 24 may be generally annular and each may be disposed and oriented about outer surfaces 27 of piston element 20 as shown in FIG. 1B. In addition, sleeve elements 22 and 24 may have a substantially constant radial or lateral thickness, illustrated in FIG. 1B as "t." Sleeve element 22 may include upper end region 21 disposed laterally adjacent to recess 26. Likewise, sleeve element 24 may include lower end region 23 disposed laterally adjacent to recess 28. Sleeve elements 22 and 24 may be substantially identical in their dimensions and configuration, but may simply be disposed about piston element 20 in opposite orientations, as shown in FIGS. 1B, 1D, and 1F. For simplicity, sleeve elements 22 and 24 will be described as being configured with a number of substantially identical features; however, the present invention recognizes and contemplates that each of sleeve elements 22 and 24 may be sized and configured according to design choice and application specific conditions.

In one aspect of the present invention, the inner surfaces 31 of sleeve elements 22 and 24 may be sized to interferingly engage the outer surfaces 27 of piston element 20, respectively. Put another way, the inner surfaces 31 of sleeve elements 22 and 24 may be smaller in diameter than the corresponding outer surfaces 27 of piston element 20. Such a configuration may affix sleeve elements 22 and 24 onto the piston element 20 with a residual force, upon positioning sleeve elements 22 and 24 thereon. In addition, interference between the sleeve elements 22 and 24 may provide a seal against fluid or gas penetrating between the outer surfaces 27 of the piston element 20 and the inner surfaces 31 of sleeve elements 22 and 24. However, it should also be understood that sleeve elements 22 and 24 may not interferingly engage the outer surfaces 27 of piston element 20, respectively, without limitation.

Also, as mentioned above, the outer lateral extent of retention flanges 43 and 45 may exceed the lateral extent of inner surfaces 31 of sleeve elements 22 and 24. Therefore, sleeve element 22 may be mechanically constrained between retention flange 43 and retention flange 42, as shown in FIG. 1B. Similarly, sleeve element 24 may be mechanically constrained between retention flange 45 and retention flange 44. Of course, the upper end 36 and the lower end 38 of piston element 20 may each be tapered, rounded, or otherwise shaped to facilitate positioning sleeve element 22 and sleeve element 24 thereabout, and onto corresponding outer surfaces 27 of piston element 20. Summarizing, sleeve elements 22 and 24 may be mechanically constrained by their corresponding retention flanges 42, 43, 44, or 45 by press-fitting the sleeve elements 22 and 24 onto piston element 20.

Therefore, sleeve element 22 and 24 may be formed of a material that elongates, to some extent, without substantial damage. For example, a material that reversibly elongates about 2% or more may allow sufficient flexibility or resiliency such that sleeve elements 22 and 24 may be positioned about the upper end 36 and lower end 38 of piston element 20, respectively, and between retention flanges 42 and 43 and 44 and 45, respectively. Reasoning further, considering the above example, the diameters of outer surfaces 27, retention flanges 43 and 45, or a combination thereof may be at least about 2% larger than the diameters of corresponding inner surface 31 of sleeve element 22 and 24. As generalized from the example, each outer surface 27 as well as retention flanges 43 and 45 of piston element 20 may be larger in diameter than the diameter of the corresponding inner surface of sleeve element 22 or 24 by up to about the amount of resilient elongation that the material forming sleeve elements 22 and 24 may accommodate without incurring substantial damage.

More generally, sleeve elements 22 and 24 may be formed from materials including polyamide, polytetrafluoroethelene (PTFE), acetal, polyethelene, polyurethane, or other suitable materials. Of course, such materials may exhibit about 2% or more elongation without substantial damage.

Figure 1C:
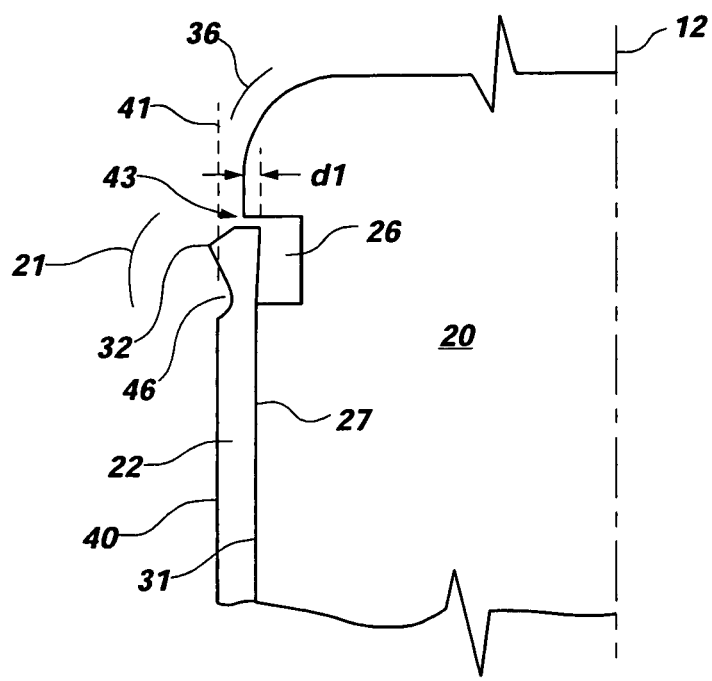
FIG. 1C shows an enlarged partial cross-sectional view of a portion of a sleeve element disposed about a piston element as shown in FIG. 1B.
Figure 1D:
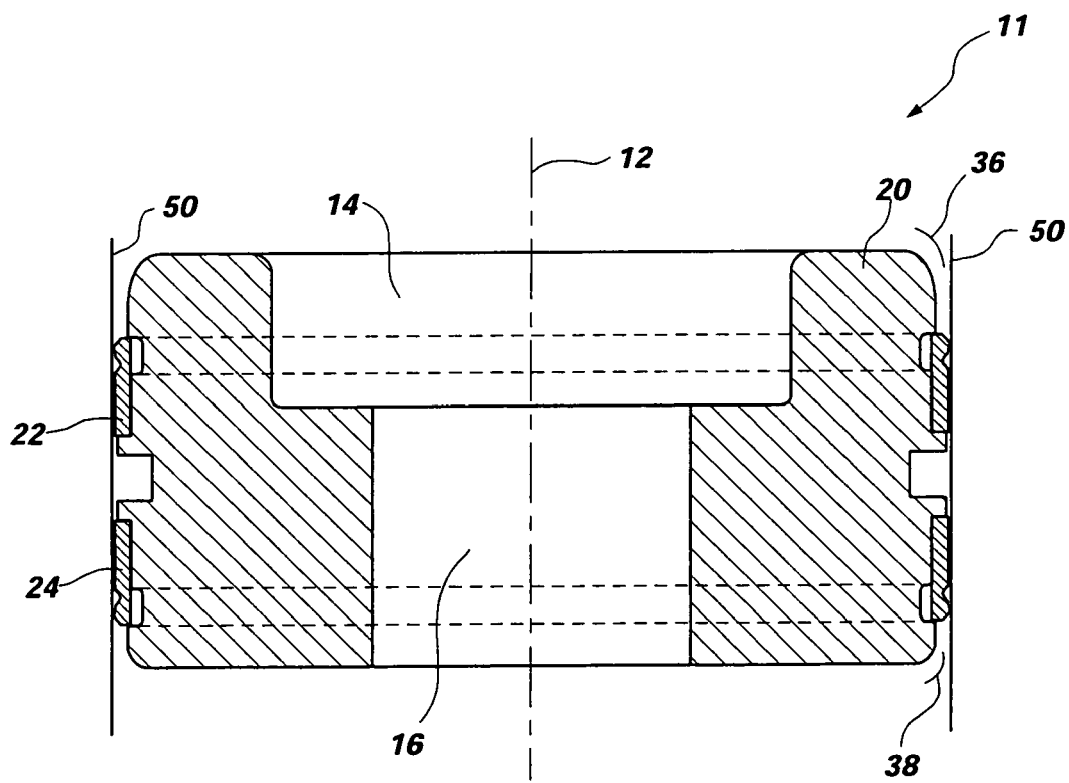
FIG. 1D shows a cross-sectional view of the exemplary seal assembly shown in FIG. 1B disposed within a bore.

Additionally, FIG. 1C shows an enlarged partial cross-sectional view of sleeve element 22 disposed about piston element 20, as shown in FIG. 1B, and depicts several aspects of sleeve element 22. For instance, sleeve element 22 may be mechanically constrained on piston element 20 because flange 43 thereof laterally overlaps sleeve element 22 as shown by distance d1. The magnitude of distance d1 may be affected by the relative amount of interference between the inner surface 31 of sleeve element 22 and the outer surface 27 of piston element 20. Explaining further, because the inner surface 31 of sleeve element 22 is smaller than the outer surface 27 of piston element 20, sleeve element 22 may slightly deflect into the laterally adjacent recess 26 without application of any external forces. However, such deflection may depend, without limitation, on the elasticity of sleeve element 22, the size and configuration of sleeve element 22, the relative temperatures of sleeve element 22 and piston element 20, the size and configuration of the laterally adjacent recess 26, and the amount of interference between the inner surface 31 of sleeve element 22 and outer surface 27 of piston element 20. Of course, the same aspects described above may be included by sleeve element 24.

Figure 1E:
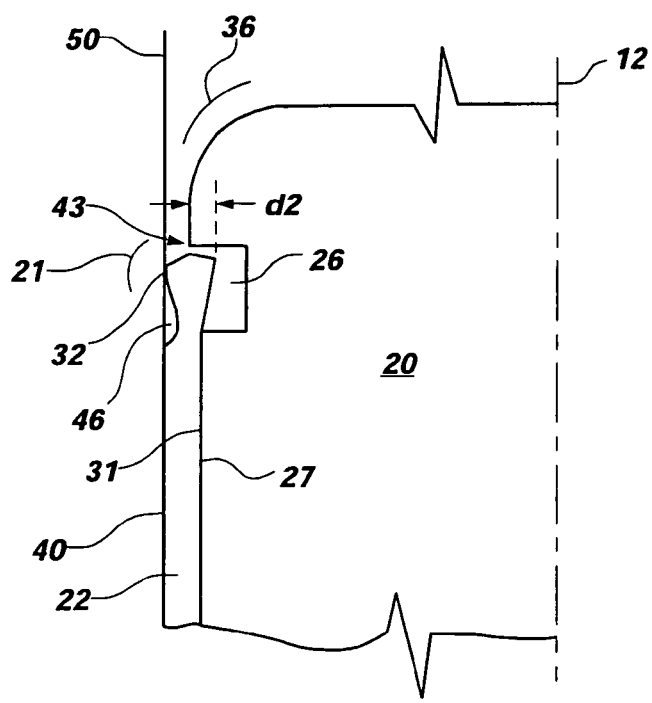
FIG. 1E shows an enlarged partial cross-sectional view of a portion of the seal assembly as shown in FIG. 1D.
Figure 1F:
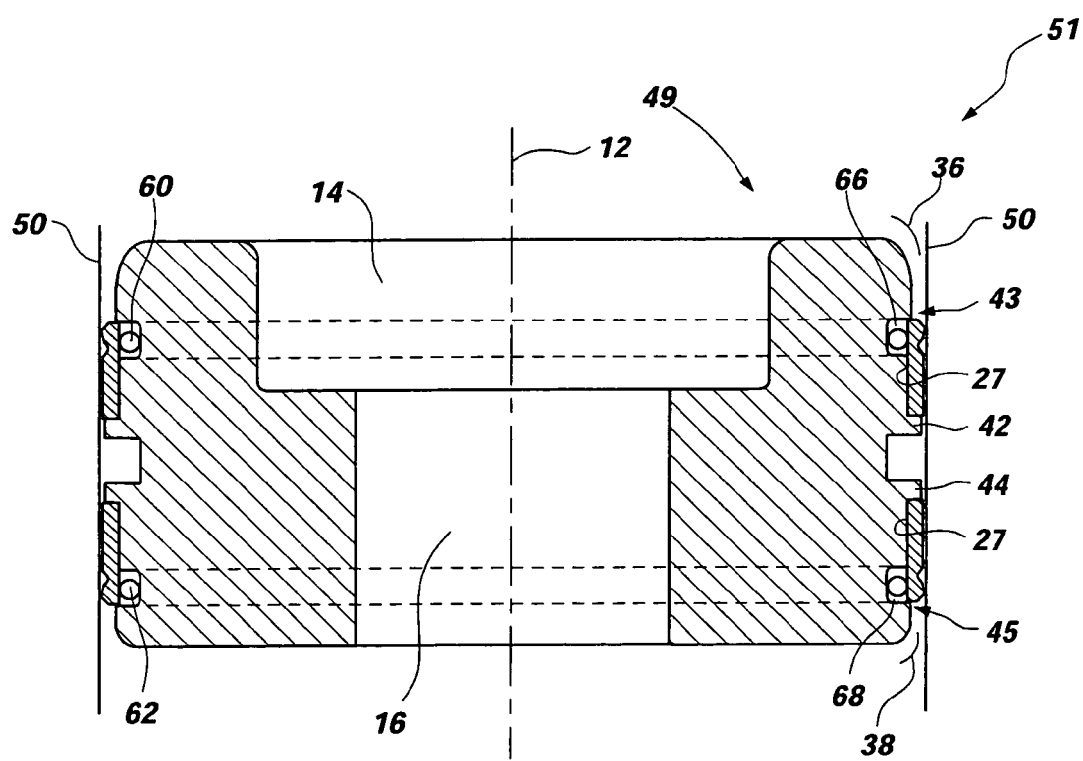
FIG. 1F shows a cross-sectional view of another exemplary embodiment of a seal assembly of the present invention disposed within a bore.

In another aspect of the present invention shown in FIG. 1C, sleeve element 22 may include a sealing feature 32 that extends laterally beyond bearing surface 40 of sleeve element 22, as shown in relation to reference line 41. Put another way, the lateral thickness of sleeve element 22 and protrusion thereof beyond bearing surface 40 may increase within the upper end region 21. Generally, the sealing feature 32 may be configured to matingly engage and seal against a bore surface 50 (FIGS. 1D and 1E). Although sealing feature 32 is shown in FIGS. 1A-1E generally as an annular feature having a pointed or sharpened tip facing laterally outwardly, the configuration of the sealing feature 32 may depend on the material that is used to form sleeve element 22, as well as the size and configuration of the components of the seal assembly 10. Therefore, the sealing feature 32 may exhibit different geometries. For instance, the sealing feature 32 may be rounded, and may include more than one protruding structure, such as, for instance, alternating sharpened and rounded protrusions. In general, the sealing feature 32 may be configured to sealingly engage a bore surface 50 (FIGS. 1D and 1E) within which the seal assembly 10 is disposed. Accordingly, the shape, size, and configuration of the sealing feature 32 may depend on the contact stresses and the expected or predicted deformation of the sleeve element 22 in relation to a bore wall or bore surface 50 (FIGS. 1D and 1E).

An exterior depression 46 in the upper end region 21 of sleeve element 22 may be positioned proximate to the sealing feature 32 thereof. Depression 46 may be beneficial in retaining an amount of lubricant in proximity to bore surface 50. Furthermore, although sleeve element 22 may, as a whole, have a substantially constant lateral or radial thickness, depression 46 may allow increased flexure in the upper end region 21 of sleeve element 22 by reducing the lateral or radial thickness thereof.

In another aspect of the present invention, sleeve element 22 may include a bearing surface 40 extending axially therealong from depression 46. Bearing surface 40 may be configured to contact or conformally engage a bore surface 50 positioned therearound and thus, may position piston element 20 in relation thereto. Since bearing surface 40 may contact bore surface 50, bearing surface 40 may be selected, treated, or modified to exhibit a desirable frictional characteristic or wear characteristic. For instance, the surface finish of bearing surface 40 may be tailored to exhibit a selected amount of friction during movement of the seal assembly 10 in relation to a bore surface 50 (FIGS. 1D and 1E). Alternatively, the bearing surface 40 may include at least one of a coating, an additive, or an embedded material to modify a frictional or wear characteristic thereof.

As mentioned above, the aspects of sleeve element 22, as shown in FIG. 1C and described above, may also apply to sleeve element 24. More particularly, sleeve element 24 may be sized to have an inner surface 31 that is smaller in diameter than the diameter of outer surface 27 of piston element 20. In addition, sleeve element 24 may include sealing feature 32 for matingly engaging and sealing against a bore surface 50 (FIGS. 1D and 1E) and a bearing surface 40 for conformally engaging the same.

FIG. 1D shows an apparatus 11 comprising seal assembly 10 disposed within bore surface 50 and FIG. 1E shows an enlarged partial cross-sectional view of a portion of sleeve element 22, as shown in FIG. 1D. Bore surface 50 may preferably be smaller than the lateral extent of sleeve elements 22 and 24, wherein the outermost lateral extent of each of sleeve elements 22 and 24 is defined by sealing features 32, as discussed above. Thus, installation of bore surface 50 about piston element 20 having sleeve element 22 disposed thereon, via contact between bore surface 50 and sealing feature 32, may cause the upper end region 21 of sleeve element 22 to be biased laterally inwardly into recess 26. Similarly, installation of bore surface 50 about piston element 20 having sleeve element 24 disposed thereon, via contact between bore surface 50 and sealing feature 32, may cause the lower end region 23 of sleeve element 24 to be biased laterally inwardly into recess 28. Such a configuration may provide improved mechanical locking of sleeve elements 22 and 24, as described below.

Such bias is illustrated by FIG. 1E, where the upper end region 21 of sleeve element 22 is shown as biased into recess 26 of piston element 20, which causes upper end region 21 to overlap with retention flange 43, as shown by distance d2. Bias of upper end region 21 of sleeve element 22 and lower end region 23 of sleeve element 24 may be caused by bore surface 50 being laterally smaller than the lateral extent of sealing feature 32. Further, such relative sizing may cause sealing feature 32 of sleeve element 22 to sealingly engage bore surface 50. As such, the apparatus 11 shown in FIG. 1D may be suited for use as a component of a double acting cylinder.

As another advantage of the apparatus 11 as depicted by FIGS. 1D and 1E, the inward biasing of the upper end region 21 of sleeve element 22 and lower end region 23 of sleeve element 24 may cause an increase in the contact stress between at least a portion of the bearing surface 40 and the bore surface 50. For instance, the biasing of upper end region 21 of sleeve element 22 into recess 26 may generate a slight deformation in the bearing surface 40 of sleeve element 22. Such a configuration may reduce clearances between bore surface 50 and sleeve elements 22 and 24, which may provide for improved positioning of the piston element 20 within bore surface 50.

Turning to FIG. 1F, another exemplary embodiment of an apparatus 51 of the present invention is shown. Apparatus 51 is similar to apparatus 11 as shown in FIGS. 1D and 1E and includes seal assembly 49 disposed within bore surface 50. More specifically, piston element 20 includes rounded upper end 36 and lower end 38 as well as retention flanges 42, 43, 44, and 45, as described above in reference to FIGS. 1A-1E.

However, apparatus 51 also includes energizer 60 disposed generally within recess 66 as well as energizer 62 disposed generally within recess 68. Energizers 60 and 62, may be formed as an annular member, such as an O-ring. Therefore, recesses 66 and 68 may be sized and configured to position energizers 60 and 62 against sleeve elements 22 and 24 and also retain energizers 60 and 62 during use. Energizers 60 and 62 may be formed of any of various materials including thermoset or thermoplastic. For example, preferably, thermoset or thermoplastic elastomers may be used, such as, for instance, polyurethane, nitrile rubber (NBR), neoprene, VITON®, silicone, or other suitable resilient materials may be used to form energizer 60, energizer 62, or both.

Energizers 60 and 62 may provide compliance as well as a biasing force against sleeve elements 22 and 24. More particularly, energizers 60 and 62 may provide compliance and a biasing force in relation to sealing features 32 as each sealingly engages bore surface 50. In addition, energizers 60 and 62 may provide a relatively robust sealing mechanism against fluid or gas penetrating between the inner surfaces 31 of sleeve elements 22 and 24 and the outer surfaces 27 of the piston element 20 than the interference therebetween alone would provide. Therefore, energizers 60 and 62 may advantageously provide compliance, biasing force, or an improved seal within the apparatus 51 of the present invention.

Figure 1G:
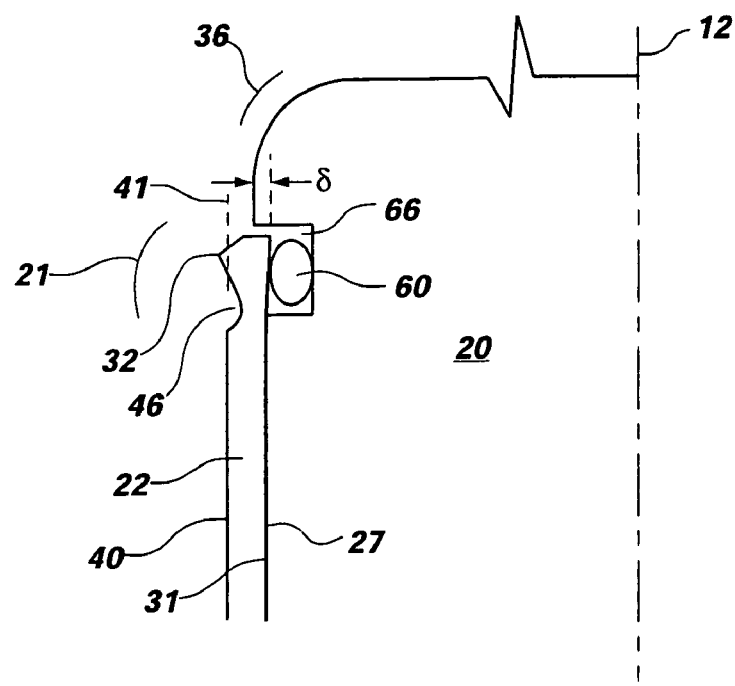
FIG. 1G shows an enlarged cross-sectional view of a portion of the seal assembly shown in FIG. 1F without the bore.

FIG. 1G shows an enlarged partial cross-sectional view of the seal assembly 49 shown in FIG. 1F, prior to the bore surface 50 being disposed thereabout. As shown in FIG. 1G, energizer 60 may be disposed generally within recess 66 formed within piston element 20. As described above, sleeve element 22 may include sealing feature 32, depression 46, and bearing surface 40. Further, sealing feature 32 may exhibit a lateral extent that exceeds the lateral extent of the bearing surface 40, as illustrated by reference line 41. In other words, the lateral thickness of sleeve element 22 may increase in the upper end region 21 of sleeve element 22 to form sealing feature 32. Upon positioning of sleeve element 22 about piston element 20, sleeve element 22 may contact energizer 60. Alternatively, energizer 60 may not initially contact sleeve element 22. Also, sleeve element 22 may be mechanically constrained on piston element 20 because flange 43 of piston element 20 laterally overlaps sleeve element 22 as shown by δ.

Figure 1H:
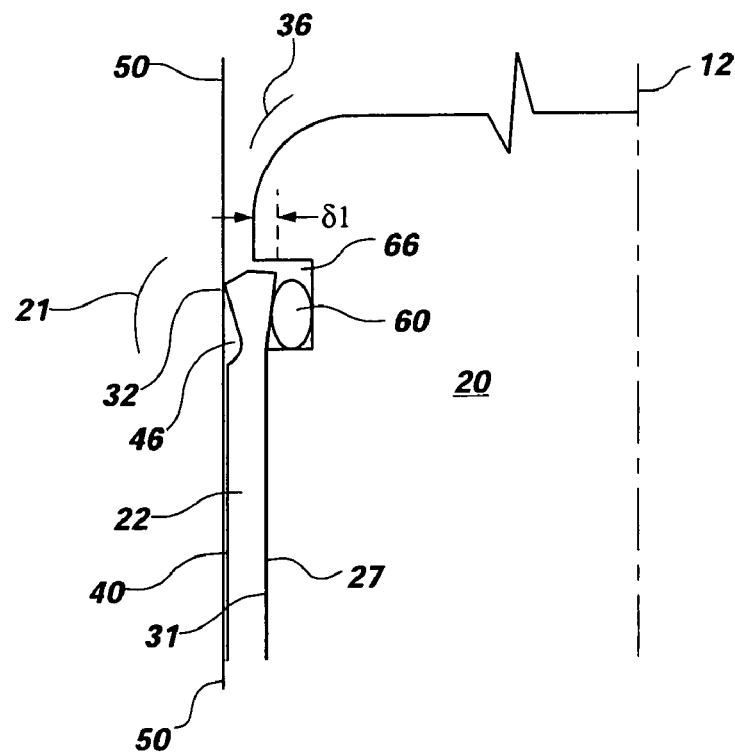
FIG. 1H shows an enlarged cross-sectional view of a portion of the seal assembly shown in FIG. 1F.

FIG. 1H shows an enlarged partial cross-sectional view of the apparatus 51 shown in FIG. 1F. As shown in FIG. 1H, upon positioning of bore surface 50 about sleeve element 22, contact between bore surface 50 and sealing feature 32 may cause the upper end region 21 of sleeve element 22 to compress energizer 60. In addition, sealing feature 32 may sealingly engage bore surface 50, biasing the upper end region 21 of sleeve element 22 laterally inwardly within recess 66 as shown in FIG. 1G. Of course, the amount of lateral overlap between the upper end region 21 of sleeve element 22, denoted by δ1, may increase according to the bias of upper end region 21 laterally into recess 66. Of course, energizer 60 may resiliently support biasing of upper end region 21 of sleeve element 22 into recess 66. As may also be seen in reference to FIG. 1H, biasing upper end region 21 of sleeve element 22 into recess 66 may also preferentially retain or position energizer 60 against the lower end of recess 66. More specifically, the upper end region 21 of sleeve element 22 may be configured to preferentially position energizer 60 generally within the lower axial region of recess 66. Such a configuration may provide a relatively robust sealing arrangement and may resiliently support the upper end region 21 of sleeve element 22 within recess 66.

As discussed above, energizers may provide an improved seal against fluid or gas moving therearound, which seal may be useful in inhibiting penetration of fluid or gas between the piston element 20 and sleeve elements 22 and 24. However, the presence of energizers 60 and 62 may also prevent the release of pressurized fluid or gas that may become disposed between piston element 20 and sleeve element 22, sleeve element 24, or both. Such pressurized fluid or gas, if retained between the piston element 20 and the inner surface 31 of sleeve element 22 or 24 by corresponding energizer 60 or 62, may cause sleeve elements 22 or 24 to be damaged. More specifically, damage may occur to sleeve element 22, sleeve element 24, or both when the pressure acting on the inner surface 31 of sleeve element 22, sleeve element 24, or both is higher than the pressure acting on the corresponding bearing surface 40 of sleeve element 22, sleeve element 24, or both.

Figure 1I:
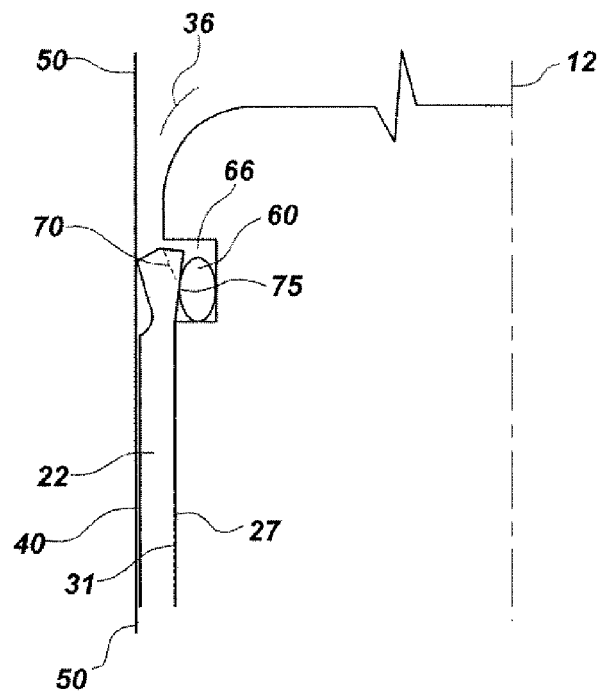
FIGS. 1I and 1J each show enlarged cross-sectional views of an exemplary pressure relief structure of the present invention.
Figure 1J:
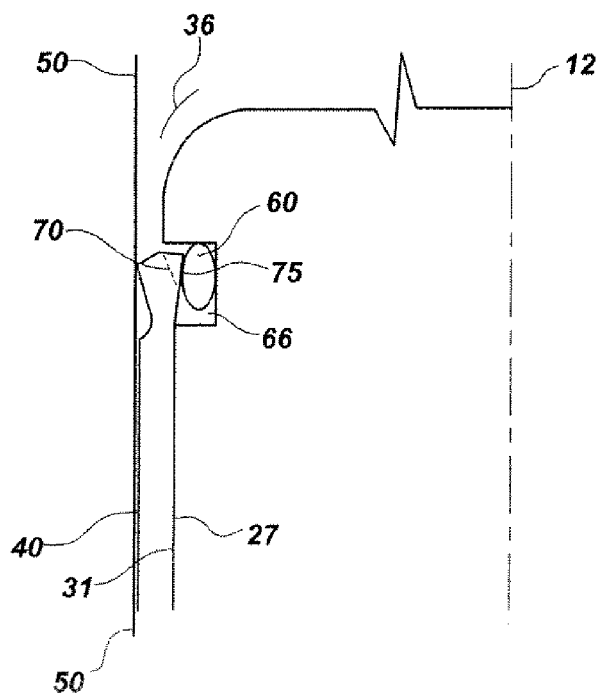

Therefore, in another aspect of the present invention, a pressure relieving structure may be included in combination with an energizer, the pressure relieving structure configured to release pressurized gas or fluid that exists between the inner surface 31 of either of sleeve element 22 or 24 and the outer surface 27 of piston element 20. In one embodiment, a vent feature 70 may be formed within the upper end region 21 of sleeve element 22. More particularly, as shown in FIGS. 1I and 1J, vent feature 70 may extend along the surface of the sleeve element 22 adjacent to the energizer 60 so that a change in position of the energizer 60 selectively allows or inhibits flow therearound. Vent feature 70 may be a broached indentation or channel along the inner surface 31 of the sleeve element 22. The vent feature 70 may be positioned so that when the energizer 60 contacts the sleeve element 22 below a selected position, flow around or about the energizer 60 is substantially prevented or inhibited. However, when energizer 60 contacts sleeve element 22 above the selected position, flow around or about energizer 60 is allowed.

For instance, during operation, a pressure difference across the energizer 60 in different directions may cause the energizer 60 to be positioned differently within recess 66. For instance, when the pressure acting above the contact point 75 between energizer 60 and sleeve element 22 is higher than the pressure acting therebelow, energizer 60 may be forced downward and therefore positioned along the axial lower portion of recess 66, as depicted in FIG. 1I. In this position, energizer 60 may effectively seal against fluid or gas passing thereacross. Conversely, where the pressure acting below contact point 75 between energizer 60 and sleeve element 22 is greater than the pressure acting on the energizer 60 above the contact point 75, the energizer 60 may be forced upwardly within recess 66, as shown in FIG. 1J. As shown in FIG. 1J, fluid or gas within the lower portion of recess 66 may pass by energizer 60 upwardly through vent feature 70, thus reducing the pressure between the inner surface 31 of sleeve element 22 and the outer surface 27 of piston element 20. As discussed above, although the vent feature 70 is described in relation to sleeve element 22, sleeve element 24 may also include a pressure relief structure such as the vent feature 70 described above.

Figure 1K:
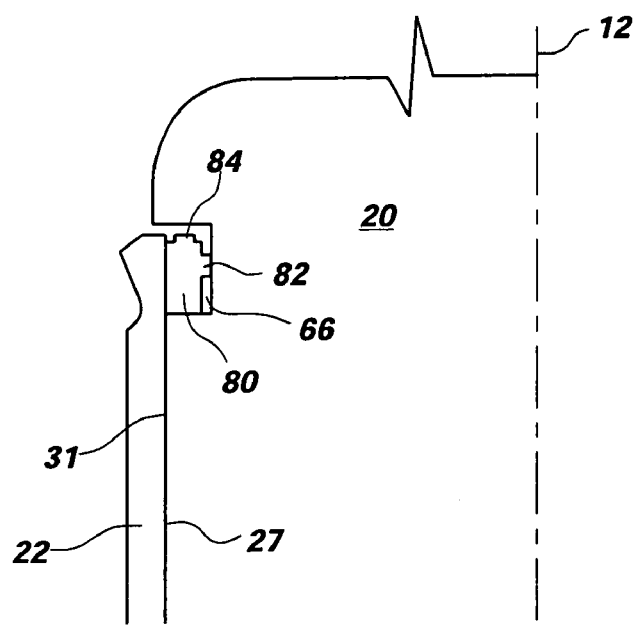
FIG. 1K shows an enlarged cross-sectional view of an exemplary pressure equalizing structure of the present invention.
Figure 1M:
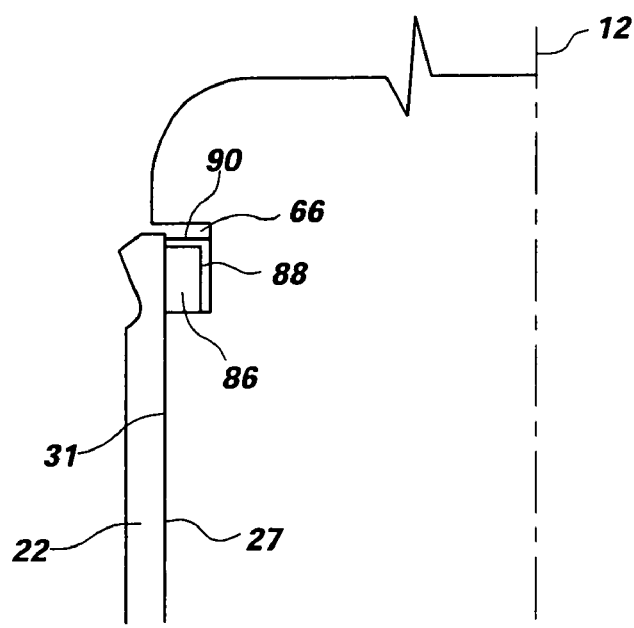
FIG. 1M shows an enlarged cross-sectional view of another exemplary pressure equalizing structure of the present invention.
Figure 1L:
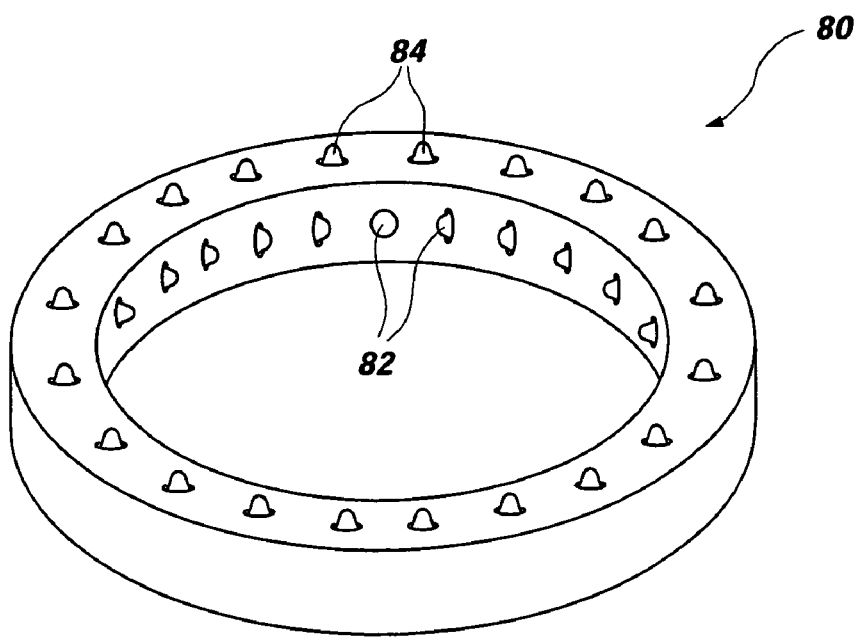
FIG. 1L shows a perspective view of the pressure equalizing structure of FIG. 1K.
Figure 1N:
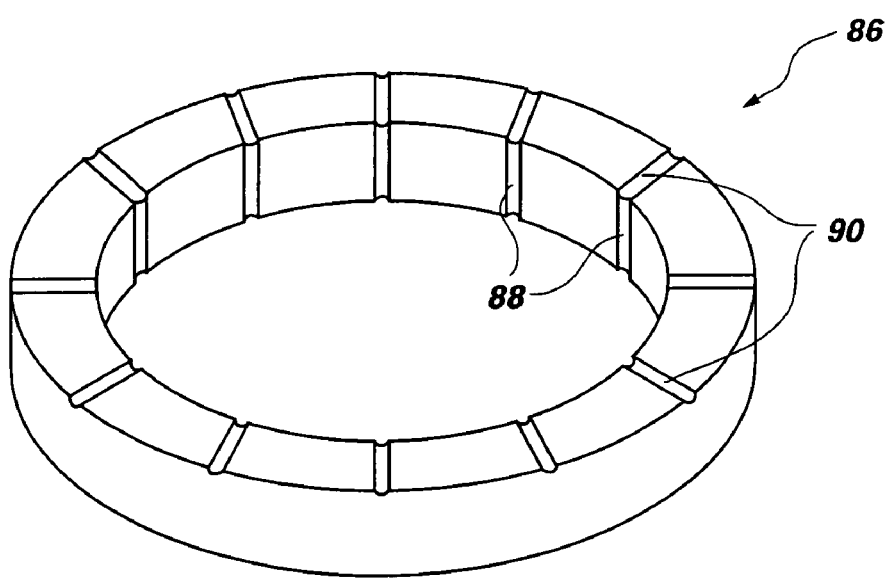
FIG. 1N shows a perspective view of the pressure equalizing structure of FIG. 1M.

Further, as disclosed in U.S. Pat. No. 6,595,524 to Zitting, assigned to the assignee of the present invention, and incorporated in its entirety by reference, a portion of an energizer may be configured to allow preferential flow therearound. As shown in FIGS. 1K-1M, energizers 80 and 86 may include stand-off protrusions, grooves, or both that may selectively allow fluid or gas to flow or pass therearound. Specifically, as shown in FIGS. 1K and 1L, energizer 80 may include circumferentially spaced axial protrusions 84 as well as circumferentially spaced lateral protrusions 82. Thus, when energizer 80 is positioned generally within recess 66 as shown in FIG. 1K, energizer 80 may seal against a fluid or gas passing thereby. However if the pressure between inner surface 31 of sleeve element 22 and piston element 20 increases over the pressure axially above energizer 80, energizer 80 may be moved longitudinally upwardly. Thus, once energizer 80 no longer contacts the lower axial surface of recess 66, fluid or gas may pass therearound, by way of the flow path between the wall of the recess 66 and the surface of energizer 80, portions of which are spaced away from the wall of the recess 66 by way of axial protrusions 84 and lateral protrusions 82. Similarly, as shown in FIGS. 1M and 1N, energizer 86 may seal against the lower axial surface of recess 66 if pressure acting on the upper surface of energizer 86 exceeds the pressure acting on the lower surface thereof. However, if pressure acting on the lower surface of energizer 86 exceeds the pressure acting on the upper surface thereof, energizer 86 may be moved within recess 66, allowing the fluid or gas at a higher pressure to move by the energizer 86, via axial channels 88 and lateral channels 90, to equalize the pressure across energizer 86.

Accordingly, the present invention may include a preferential pressure relief feature that allows for pressure between the inner surface 31 of sleeve elements 22 and 24 and the outer surface 27 of piston element 20 in excess of the pressure that is applied to the axial upper surface of an energizer to be relieved. Such a configuration may prevent damage to sleeve elements 22 and 24 due to pressure acting on the inner surfaces 31 of sleeve elements 22 and 24 that exceeds pressure acting on the bearing surfaces 40 thereof, respectively.

Figure 1P:
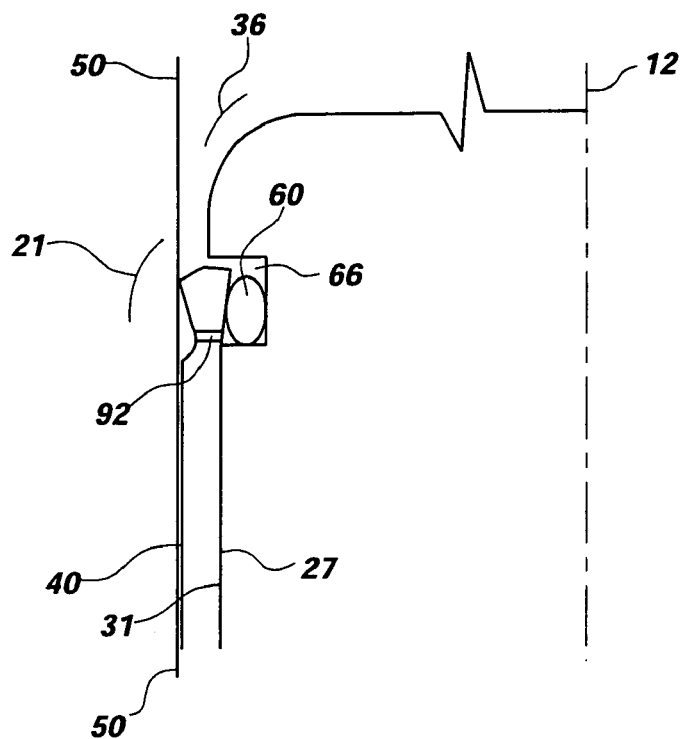
FIG. 1P shows an enlarged cross-sectional view of a further exemplary pressure equalizing structure of the present invention.

In addition, the present invention contemplates another mechanism for inhibiting damage to either of sleeve elements 22 and 24 due to an increased pressure acting on the inner surfaces 31 thereof, in relation to the pressure acting on the bearing surfaces 40 thereof, respectively. Particularly, as shown in FIG. 1P, the pressure acting on the inner surface(s) 31 of sleeve elements 22 and 24 may be substantially equalized in relation to the pressure acting on the bearing surface(s) 40 thereof, respectively. Aperture(s) 92 may extend between the inner surface 31 of either sleeve elements 22 or 24 to the bearing surface 40 thereof, respectively, so that pressure may communicate therebetween. In such a configuration, pressure differences may be inhibited, since the pressure acting on the inner surface 31 of the sleeve element 22 and the pressure acting on the bearing surface 40 thereof may substantially equalize. Although aperture(s) 92 are shown as positioned in the upper end region 21 of sleeve element 22, apertures may be disposed along sleeve element 22 without limitation, and may take any number of geometries, such as round holes, axial slots, circumferential slots, or may be otherwise configured to allow pressurized fluid or gas to communicate between inner surface 31 of sleeve elements 22 or 24 with its corresponding bearing surface 40 thereof.

Figure 2A:
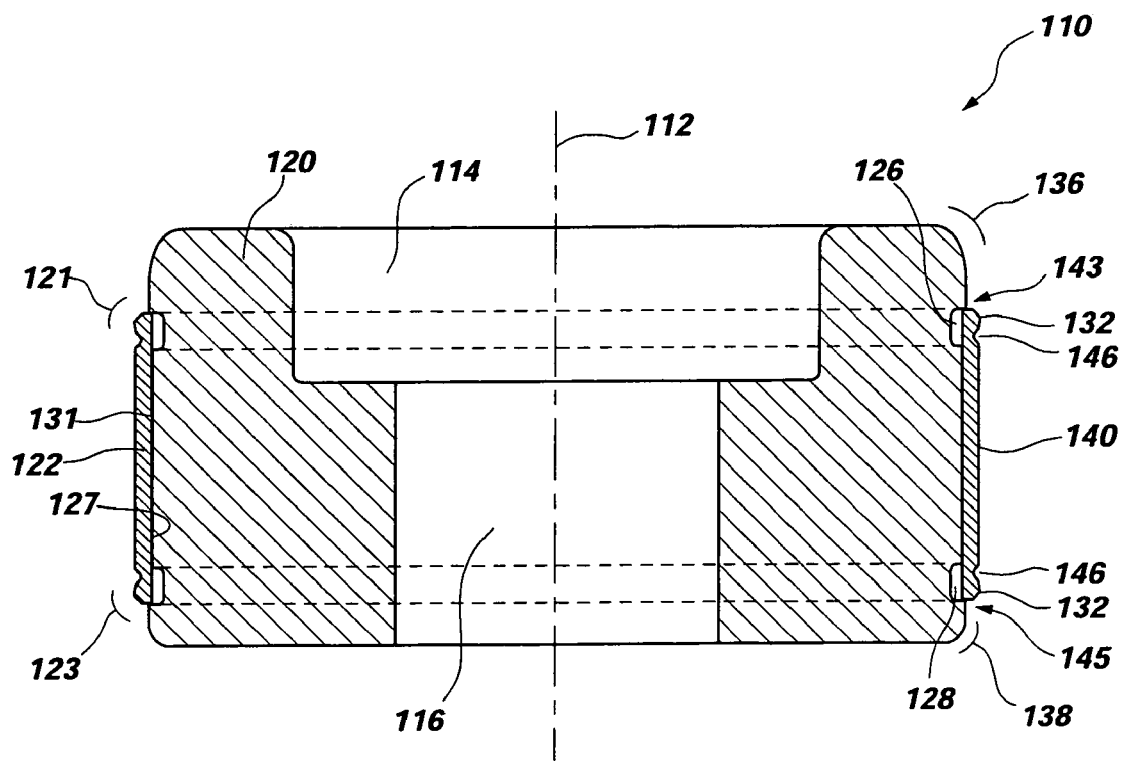
FIG. 2A shows a cross-sectional view of another exemplary embodiment of the seal assembly of the present invention.

Referring now to FIG. 2A, a side cross-sectional view of another exemplary embodiment of a seal assembly 110 of the present invention is shown. Seal assembly 110 includes piston element 120 comprising a generally annular body disposed about axis 112 and including recesses 114 and 116. Sleeve element 122 is shown as positioned about piston element 120, and may be sized so that the diameter of inner surface 131 thereof is smaller than the diameter of outer surface 127 of piston element 120 prior to installation thereon. Therefore, piston element 120 includes upper end region 136 and lower end region 138, which are shown as being rounded, although upper end region 136 and lower end region 138 may be tapered, rounded or otherwise configured to facilitate positioning of sleeve element 122 about piston element 120. Alternatively, a device or apparatus, such as an installation cone, as known in the art, may be used to elongate sleeve element 122 so that it may be positioned about piston element 120 without configuring the ends of the piston element 120 to facilitate positioning of sleeve element 122 thereon.

Thus, the inner surface 131 of sleeve element 122 may preferably elongate to accommodate the interference between the outer surface 127 of the piston element 120 as well as disposal about retention flanges, which, as discussed below, may also be sized larger than the diameter of inner surface 131 of sleeve element 122. Therefore, sleeve element 122 may be formed from a material that accommodates expansion or elongation without incurring substantial damage thereto. For example, sleeve element 122 may be formed from a material that exhibits about 2% or more elongation including polyamide, polytetrafluoroethelene (PTFE), acetal, polyethelene, polyurethane, or other materials. However, it should also be understood that sleeve element 122 may not be configured to expand or elongate, without limitation.

Alternatively, shrink fitting may be utilized to dispose the sleeve element 122 onto the piston element 120, by cooling the piston element 120 relative to the temperature of the sleeve element 122, heating the sleeve element 122 relative to the temperature of the piston element 120, or both in order to temporarily reduce the amount of interference therebetween. However, the desirability of shrink fitting may depend on the sizes of the piston element 120 and sleeve element 122 as well as the respective materials forming same.

Figure 2B:
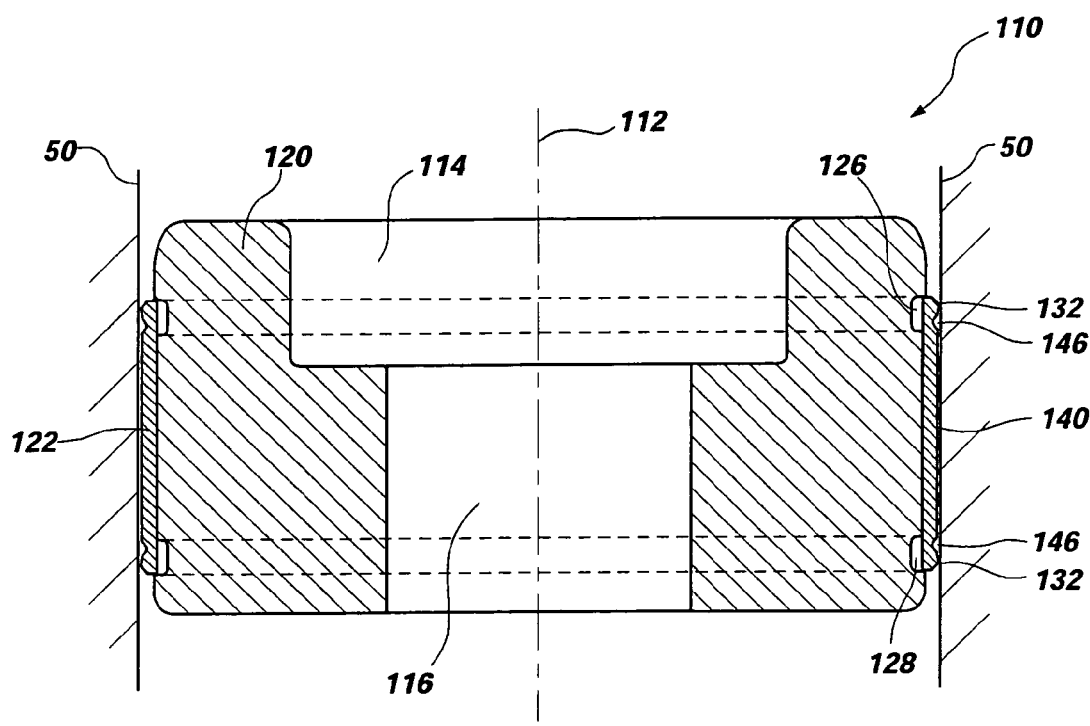
FIG. 2B shows a cross-sectional view of an apparatus including a bore disposed about the seal assembly as shown in FIG. 2A.

Further, as shown in FIG. 2A, sleeve element 122 may be disposed about piston element 120 between retention flanges 143 and 145. The lateral extent of retention flanges 143 and 145 may exceed the lateral position of inner surface 131 of sleeve element 122, mechanically constraining sleeve element 122 therebetween. Sleeve element 122 may include sealing features 132, configured to sealingly engage a bore surface 50 (FIG. 2B), depressions 146, as described hereinabove, as well as bearing surface 140, configured to conformally engage bore surface 50 (FIG. 2B). Sleeve element 122 may also include an upper end region 121 positioned laterally adjacent to recess 126 and a lower end region 123 positioned laterally adjacent to recess 128.

Generally, the behavior of upper end region 121 and lower end region 123 as disposed laterally adjacent to recesses 126 and 128, respectively, may be analogous to the behavior as described above in relation to upper end region 21 of sleeve element 22 and lower end region 23 of sleeve element 24. Accordingly, as shown in FIG. 2B, sealing features 132 of sleeve element 122 may sealingly engage bore surface 50 disposed therearound, and upper end region 121 as well as lower end region 123 )see FIG. 2A) may be biased into laterally adjacent recesses 126 and 128, respectively. In addition, sleeve element 122 includes bearing surface 140 for conformally engaging bore surface 50. Such a configuration may provide relatively efficient and effective sealing and bearing structure for use in machine components that move relative to one another.

Configuring the sleeve element 122 as a unitary member may be advantageous for manufacturing ease and cost, as well as cost of fabricating a seal assembly. In addition, as may be appreciated, the shape of sleeve element 122 may be affected by the configuration of sleeve element 122 as a unitary structure in combination with upper end region 121, lower end region 123, and recesses 126 and 128. More particularly, bending of the upper end region 121 and lower end region 123 may cause the sleeve element 122 to assume a cross-sectional arcuate or parabolic shape wherein the bearing surface 140 is biased toward the bore surface 50. Such a configuration may be suited to position or bias the piston element 120 with respect to the bore surface 50.

Figure 3A:
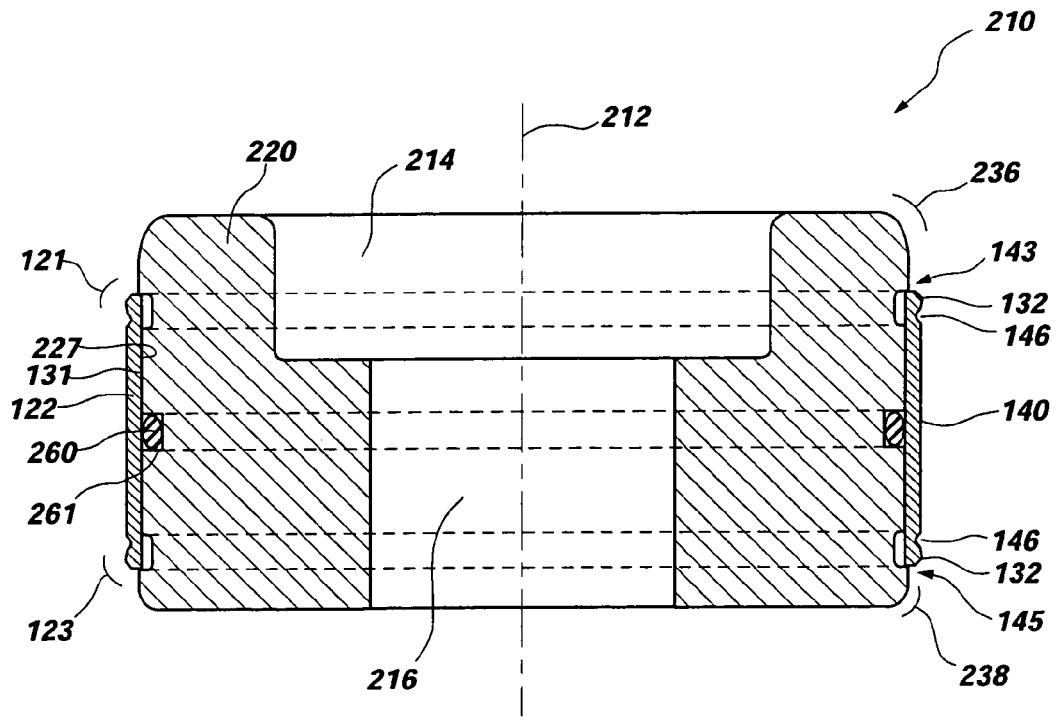
FIG. 3A shows a cross-sectional view of another exemplary embodiment of the seal assembly of the present invention.
Figure 3B:
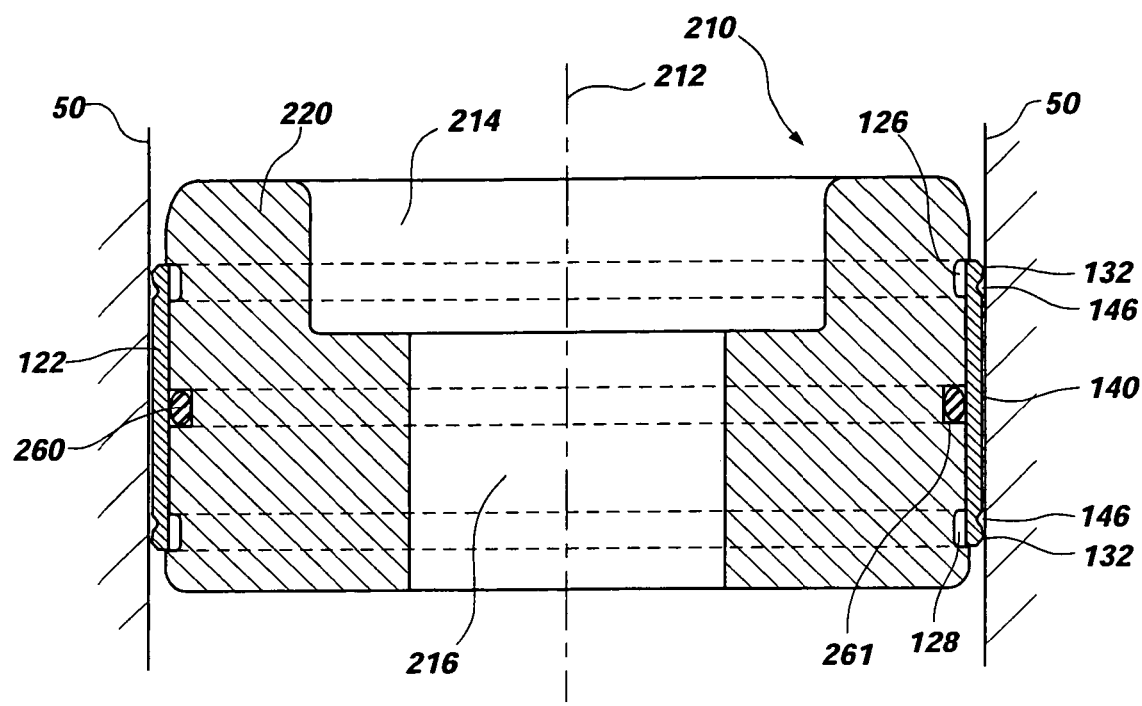
FIG. 3B shows a cross-sectional view of an apparatus including a bore disposed about the seal assembly as shown in FIG. 3A.

Turning to FIG. 3A, which depicts another exemplary embodiment of a seal assembly 210 of the present invention, it may be desirable to position an energizer 260 generally within recess 261 formed in piston element 220. Such a configuration may provide resilient support and bias to the sleeve element 122 in relation to a bore surface 50 (FIG. 3B). Therefore, energizer 260 may be formed of a material that exhibits reversible deformation or resiliency. Such materials may include, for instance, thermosets or thermoplastics. More particularly, thermoset or thermoplastic elastomers may be used, such as, for example, polyurethane, nitrile rubber (NBR), neoprene, VITON®, silicone, or other suitable resilient materials may be used to form energizer 260.

Analogous to the description of seal assembly 110, seal assembly 210 includes piston element 220 comprising a generally annular body disposed about axis 212 and may include recesses 214 and 216 formed therein. Also, piston element 220 may include upper end region 236 and lower end region 238, which are shown as being rounded to facilitate positioning of sleeve element 122 about piston element 220. In addition, sleeve element 122 may be positioned about piston element 220, and may be sized so that the diameter of inner surface 131 thereof is smaller than the diameter of outer surface 227 of piston element 220. Further, as shown in FIG. 3A, sleeve element 122 may be disposed about piston element 220 between retention flanges 143 and 145, the lateral extent of which may exceed the lateral position of inner surface 131 of sleeve element 122, to mechanically constrain sleeve element 122 therebetween. Sleeve element 122 may include sealing features 132, configured to sealingly engage a bore surface 50 (shown in FIG. 3B), depressions 146, as described hereinabove, as well as bearing surface 140, configured to conformally engage bore surface 50 (shown in FIG. 3B). Sleeve element 122 may also include an upper end region 121 positioned laterally adjacent to recess 126 and a lower end region 123 positioned laterally adjacent to recess 128 (FIG 3B).

As set forth above, bending of the upper end region 121 and lower end region 123 may be analogous to the behavior as described above in relation to upper end region 21 of sleeve element 22 and lower end region 23 of sleeve element 24. Accordingly, as shown in FIG. 3B, sealing features 132 of sleeve element 122 may sealingly engage bore surface 50 disposed therearound, and upper end region 121 as well as lower end region 123 (see FIG. 3A) may be biased into corresponding laterally adjacent recesses 126 and 128. In addition, bearing surface 140 of sleeve element 122 may conformally engage bore surface 50. However, the position, size, and configuration of energizer 260 may be adjusted. For instance, energizer 260 may be positioned, sized, and configured to provide a selected support characteristic to the sleeve element 122. More particularly, the resiliency of energizer 260 may be tailored to bias the sleeve element 122 laterally outwardly toward the bore surface 50. Of course, more than one energizer may be used to bias sleeve element 122. Further, the shape of the sleeve element 122 as disposed within bore surface 50 may be tailored by way of configuring one or more energizer.

Figure 4A:
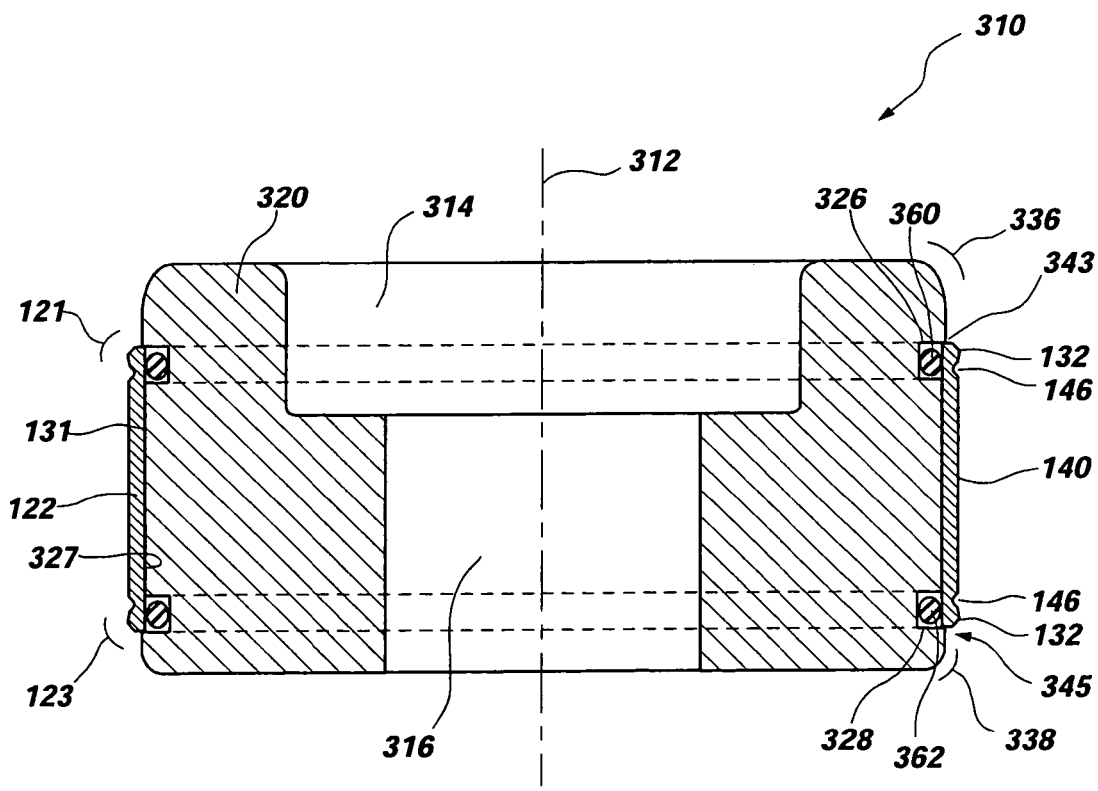
FIG. 4A shows a cross-sectional view of another exemplary embodiment of the seal assembly of the present invention.
Figure 4B:
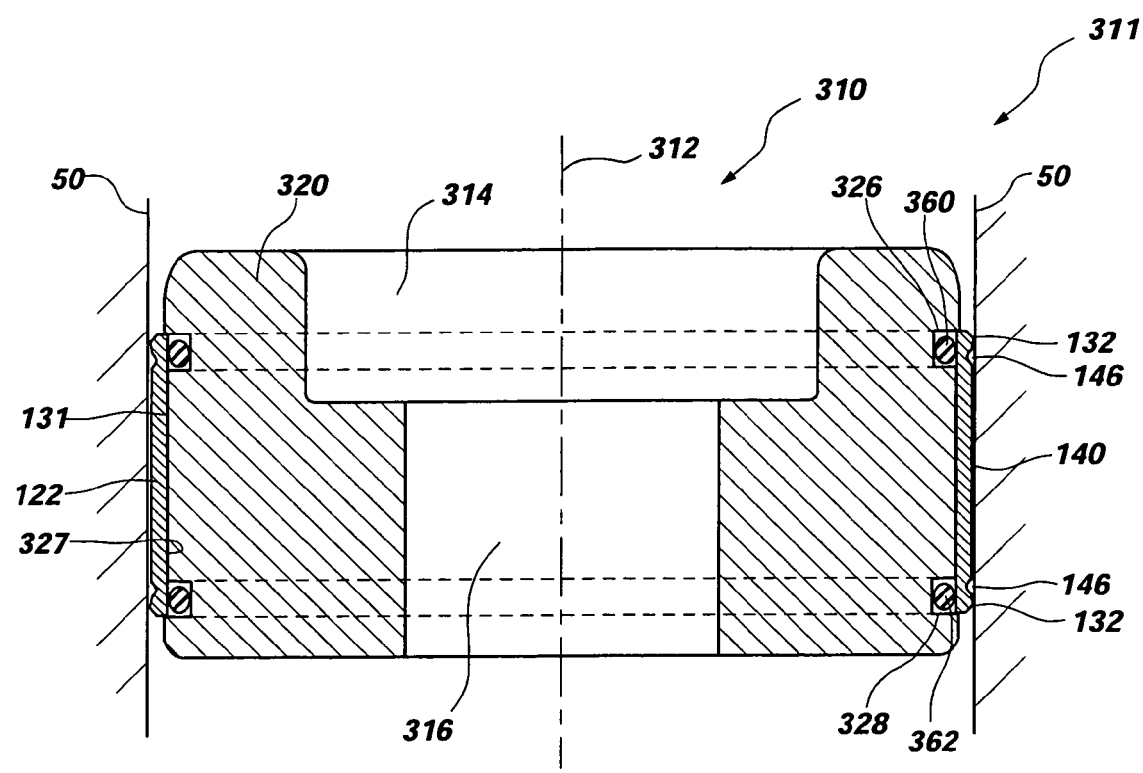
FIG. 4B shows a cross-sectional view of an apparatus including a bore disposed about the seal assembly as shown in FIG. 4A.

Moving to FIGS. 4A and 4B, FIG. 4A shows a cross-sectional view of yet another exemplary embodiment of a seal assembly 310 of the present invention that includes energizers 360 and 362 disposed within corresponding recesses 326 and 328. FIG. 4B shows a cross-sectional view of an apparatus 311 including the seal assembly 310 as shown in FIG. 4A disposed within bore surface 50. As discussed in relation to FIGS. 1F, 1G, and 1H, regarding sleeve element 22, analogously, such a configuration may provide resilient support and bias to the sleeve element 122 in relation to a bore surface 50. Thus, energizers 360 and 362 may be formed of a resilient, extensible, or reversibly deformable material as discussed above.

Seal assembly 310 includes piston element 320 comprising a generally annular body disposed about axis 312 and may include recesses 314 and 316 formed therein. Piston element 320 may also comprise upper end region 336 and lower end region 338, which may be rounded or tapered to facilitate positioning of sleeve element 122 about piston element 320. According to the present invention, sleeve element 122 may be sized so that the diameter of inner surface 131 thereof is smaller than the diameter of outer surface 327 of piston element 320. Also, as shown in FIG. 4A, sleeve element 122 may be disposed about piston element 320 between retention flanges 343 and 345. The lateral extent of retention flanges 343 and 345 may exceed the lateral position of inner surface 131 of sleeve element 122, so that positioning sleeve element 122 therebetween mechanically constrains sleeve element 122 onto the piston element 320.

Sleeve element 122 may include sealing features 132, configured to sealingly engage a bore surface 50 (shown in FIG. 4B), depressions 146, as described hereinabove, as well as bearing surface 140, which may be configured to conformally engage bore surface 50 (shown in FIG. 2B). Sleeve element 122 may also include an upper end region 121 positioned laterally adjacent to recess 326 and a lower end region 123 positioned laterally adjacent to recess 328.

Bending of the upper end region 121 and lower end region 123 may be comparable to the behavior as described above in relation to upper end region 21 of sleeve element 22 and lower end region 23 of sleeve element 24. Accordingly, as shown in FIG. 4B, sealing features 132 of sleeve element 122 may sealingly engage bore surface 50 disposed therearound, and upper end region 121 as well as lower end region 123 (see FIG. 4A) may be respectively biased into corresponding laterally adjacent recesses 326 and 328. Accordingly, the upper end region 121 and lower end region 123 of sleeve element 122 may laterally overlap corresponding retention flanges 343 and 345.

Further, seal assembly 310 may include features as described above with reference to FIGS. 1I-1P. For instance, seal assembly 310 may include a pressure relief feature or a pressure equalization feature. A pressure relief feature may allow for pressure between the inner surface 131 of sleeve element 122 and the outer surface 327 of piston element 320 in excess of the pressure that is applied to the axial upper surface of an energizer to be reduced or relieved. Any of the pressure equalization features described above may be employed. For instance, apertures 94 (FIG. 1P) that extend between the inner surface 131 of sleeve element 122 and the bearing surface 140 of sleeve element 122 may allow for pressure acting on each surface to be substantially equalized. Such a configuration may prevent damage to sleeve element 122 due to pressure acting on the inner surface 131 of sleeve element 122 that exceeds pressure acting on the bearing surface 140 thereof, respectively.

Figure 5A:
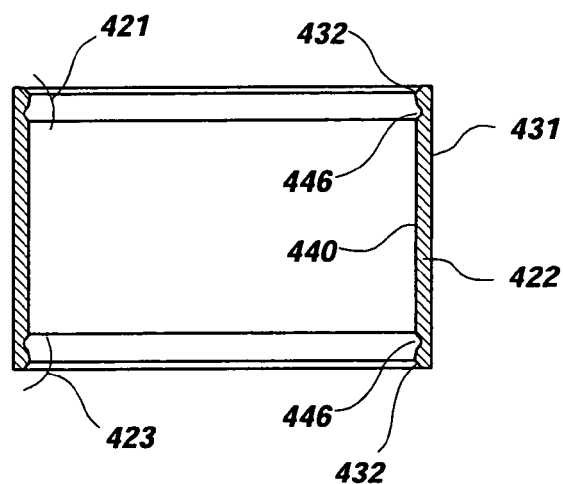
FIG. 5A shows a cross-sectional view of another exemplary embodiment of the seal element of the present invention.

As may be appreciated, there are many variations and combinations of components that may include the sleeve element of the present invention. Specifically, it is contemplated by the present invention that a sleeve element according to the present invention may be positioned within a bore surface, such as within an annular groove, and may be configured to seal against a piston element surface, wherein the piston element may comprise a cylindrical body such as a rod. FIG. 5A illustrates a sleeve element 422 of the present invention wherein the sealing features 432 are oriented laterally inwardly. In addition, sleeve element 422 includes a bearing surface 440 that is also oriented laterally inwardly.

Figure 5B:
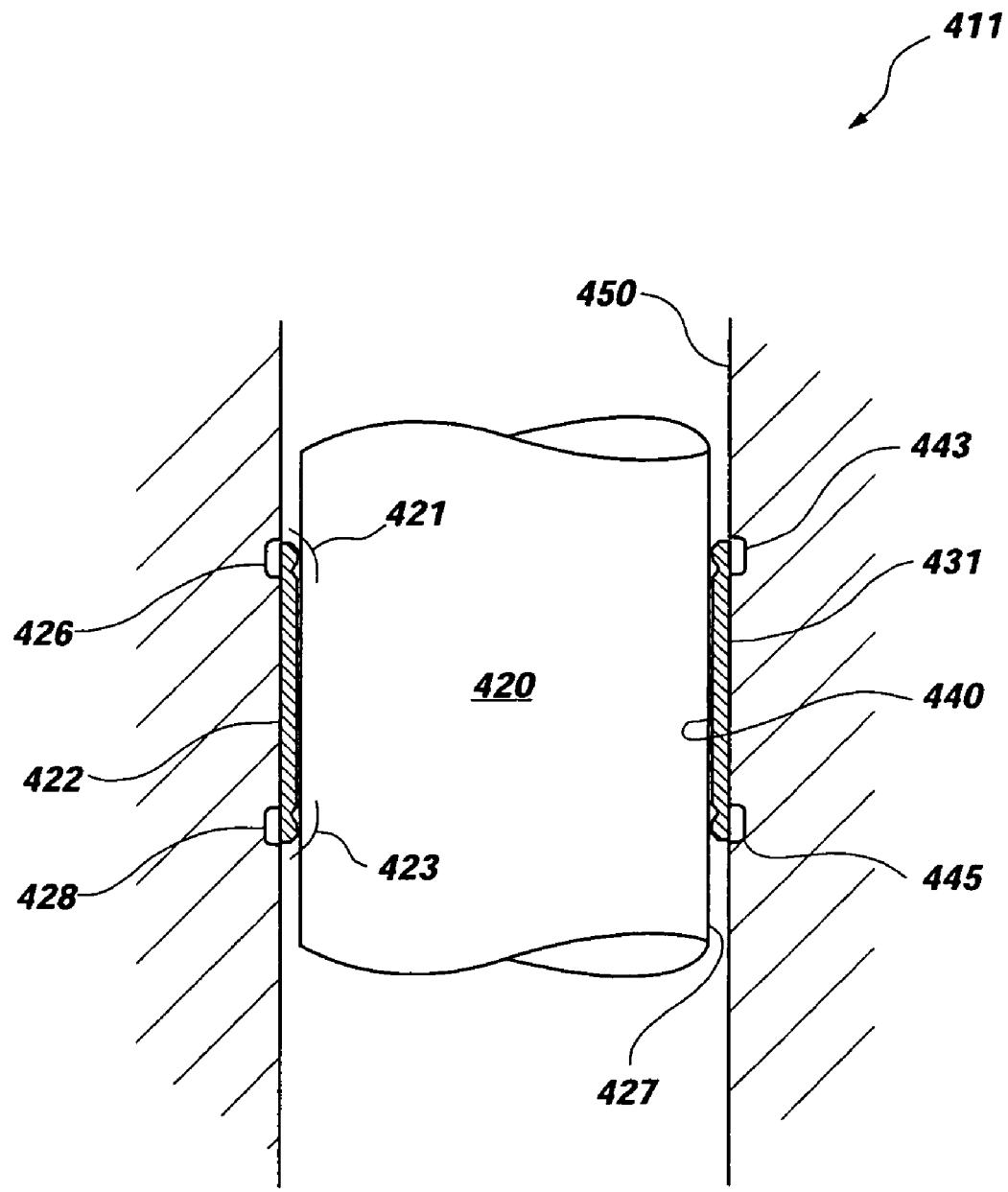
FIG. 5B shows a cross-sectional view of an apparatus including a bore disposed about the seal element and a piston element disposed within the seal element as shown in FIG. 5A.

FIG. 5B shows a cross-sectional view of an apparatus 411 including the sleeve element 422 as shown in FIG. 5A disposed within bore surface 450. Of course, apparatus 411 may include at least one energizer (not shown), which may provide resilient support, bias, or both to a portion of the sleeve element 422. Sealing features 432 and depressions 446 are not labeled in FIG. 5B, for clarity.

Sleeve element 422 may be sized so that the diameter of outer surface 431 thereof is larger than the diameter of bore surface 450. Such a configuration may provide interference between the sleeve element 422 upon disposal within bore surface 450. Thus, sleeve element 422 may comprise a material that exhibits about 2% or more resilient compression or elongation. However, it should also be understood that sleeve element 422 may not be configured to compress or deform, without limitation. Also, as shown in FIG. 5B, sleeve element 422 may be disposed within bore surface 450 between retention flanges 443 and 445. The lateral extent of retention flanges 443 and 445 may be less than the lateral position of outer surface 431 of sleeve element 422, so that positioning sleeve element 422 therebetween mechanically constrains sleeve element 422 onto the bore surface 450.

In addition, sleeve element 422 may include sealing features 432, configured to sealingly engage outer surface 427 of piston element 420, depressions 446, as well as bearing surface 440, which may be configured to conformally engage outer surface 427 of piston element 420. Sleeve element 422 may also include an upper end region 421 positioned laterally adjacent to recess 426 and a lower end region 423 positioned laterally adjacent to recess 428.

Bending of the upper end region 421 and lower end region 423 may be comparable to the behavior as described above in relation to upper end region 21 of sleeve element 22 and lower end region 23 of sleeve element 24. Accordingly, as shown in FIG. 5B, sealing features 432 of sleeve element 422 may sealingly engage outer surface 427 of piston element 420 disposed thereagainst, and upper end region 421, as well as lower end region 423, may be respectively biased into corresponding laterally adjacent recesses 426 and 428. Accordingly, the upper end region 421 and lower end region 423 of sleeve element 422 may laterally overlap corresponding retention flanges 443 and 445.

Further, apparatus 411 may include features as described above with reference to FIGS. 1I-1P. For instance, apparatus 411 may include a pressure relief feature or a pressure equalization feature. A pressure relief feature may allow for pressure between the outer surface 431 of sleeve element 422 and the bore surface 450 in excess of the pressure that is applied to the axial upper surface of an energizer to be reduced or relieved. Any of the pressure equalization features described above may be employed. For instance, apertures 92 (FIG. 1P) that extend between the outer surface 431 of sleeve element 422 and the bearing surface 440 of sleeve element 422 may allow for pressure acting on each surface to be substantially equalized. Such a configuration may prevent damage to sleeve element 422 due to pressure acting on the outer surface 431 of sleeve element 422 that exceeds pressure acting on the bearing surface 440 thereof, respectively.

Figure 6A:
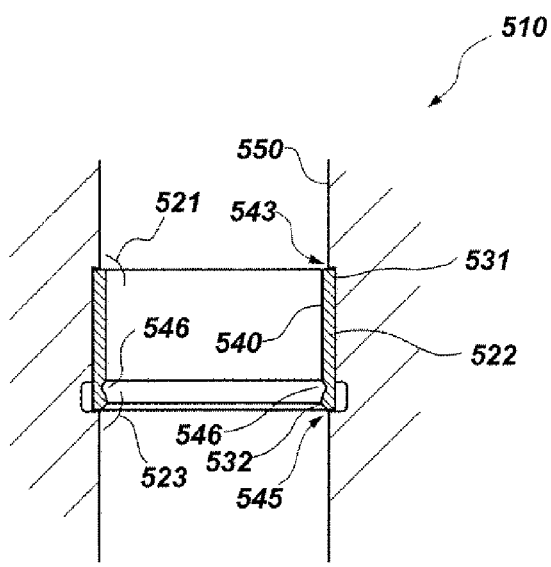
FIG. 6A shows a cross-sectional view of a further exemplary embodiment of the seal element of the present invention disposed within a bore.

In another embodiment of the present invention, a sleeve element having a sealing feature may be employed to seal against a piston element. Particularly, FIG. 6A illustrates a side cross-sectional view of assembly 510 including sleeve element 522 of the present invention wherein the sleeve element 522 includes a sealing feature 532 disposed generally proximate to lower end region 523 and is oriented laterally inwardly. In addition, sleeve element 522 includes a bearing surface 540 and a depression 546 that is also oriented laterally inwardly. FIG. 6A also shows sleeve element 522 disposed within bore surface 550. Of course, assembly 510 may include at least one energizer (not shown), which may provide resilient support, bias, or both to a portion of the sleeve element 522.

Sleeve element 522 may be sized so that the diameter of outer surface 531 thereof is larger than the diameter of bore surface 550. Such a configuration may provide interference between the sleeve element 522 upon disposal within bore surface 550. Thus, sleeve element 522 may comprise a material that exhibits about 2% or more resilient compression or deformation. However, it should also be understood that the outer surface 531 of sleeve element 522 may be sized to not interfere with the bore surface 550. Therefore, sleeve element 522 may not be configured to compress or deform, without limitation. As shown in FIG. 6A, sleeve element 522 may be disposed within bore surface 550 between retention flanges 543 and 545. The lateral extent of retention flanges 543 and 545 may be less than the lateral position of outer surface 531 of sleeve element 522, 50 that positioning sleeve element 522 therebetween mechanically constrains sleeve element 522 onto the bore surface 550. Accordingly, the upper end region 521 and lower end region 523 of sleeve element 522 may laterally overlap corresponding retention flanges 543 and 545.

Figure 6B:
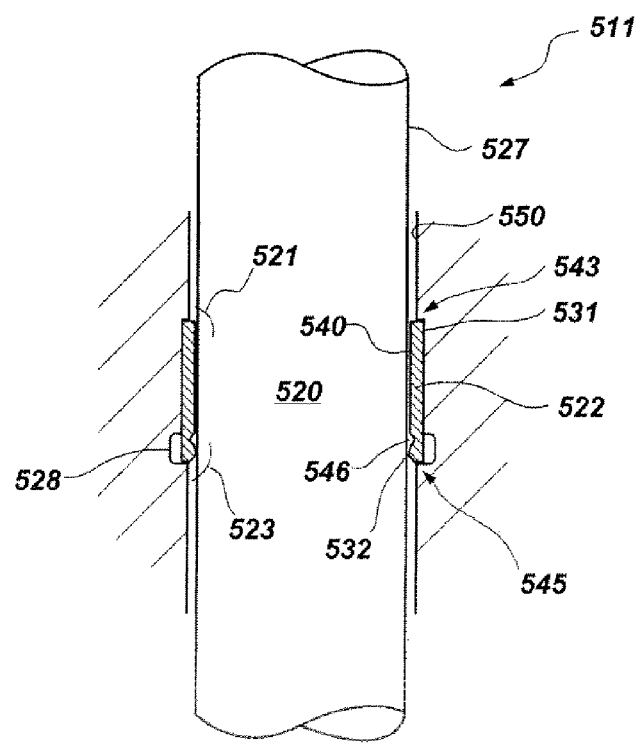
FIG. 6B shows a cross-sectional view of an apparatus including a piston disposed within the seal element as shown in FIG. 6A.

As shown in FIG. 6B, which shows apparatus 511, sleeve element 522 may include sealing feature 532, configured to sealingly engage outer surface 527 of piston element 520, depression 546, as well as bearing surface 540, which may be configured to conformally engage outer surface 527 of piston element 520. Bending of the lower end region 523 may be comparable to the behavior as described above in relation to lower end region 23 of sleeve element 24. Accordingly, as shown in FIG. 6B, sealing features 532 of sleeve element 522 may sealingly engage outer surface 527 disposed thereagainst, and lower end region 523 may be respectively biased into corresponding laterally adjacent recess 528.

Further, apparatus 511 may include features as described above with reference to FIGS. 1I-1P. For instance, apparatus 511 may include a pressure relief feature or a pressure equalization feature. A pressure relief feature may allow for pressure between the outer surface 531 of sleeve element 522 and the bore surface 550 in excess of the pressure that is applied to the axial upper surface of an energizer to be reduced or relieved. Any of the pressure equalization features described above may be employed. For instance, apertures 92 (FIG. 1P) that extend between the outer surface 531 of sleeve element 522 and the bearing surface 540 of sleeve element 522 may allow for pressure acting on each surface to be substantially equalized. Such a configuration may prevent damage to sleeve element 522 due to pressure acting on the outer surface 531 of sleeve element 522 that exceeds pressure acting on the bearing surface 540 thereof, respectively.

Although specific embodiments have been shown by way of example in the drawings and have been described in detail herein, the invention may be susceptible to various modifications, combinations, and alternative forms. Therefore, it should be understood that the invention is not intended to be limited to the particular forms disclosed. Rather, the invention includes all modifications, equivalents, combinations, and alternatives falling within the spirit and scope of the invention as defined by the following appended claims.

What is claimed is:

1. A sleeve element for sealing between a piston element surface and a bore surface disposed thereabout comprising:
    a substantially annular body including an inner surface, an outer surface, a first end region, and a second end region, wherein at least a portion of at least one of the inner surface and the outer surface is configured as a bearing surface oriented to face at least one of the piston element surface and the bore surface, and wherein a portion of the other surface of the inner surface and the outer surface is sized and configured to maintain circumferential contact with the other of the piston element surface and the bore surface;
    wherein at least a portion of the first end region of the substantially annular body is configured to be biased laterally in a first direction into at least one recess formed in the piston element surface;
    at least one sealing feature formed on the substantially annular body proximate to the at least a portion of the first end region and longitudinally spaced from the bearing surface, the at least one sealing feature being configured to be biased laterally into a laterally adjacent first recess of the at least one recess formed in the piston element surface in response to contact between the first sealing feature of the substantially annular body and the bore surface, the at least one sealing feature sized and configured to sealingly engage against the bore surface;
    a second sealing feature, wherein at least a portion of the second end region of the substantially annular body is configured to be biased laterally into the second recess formed in the piston element surface in response to contact between the second sealing feature of the substantially annular body and the bore surface, the second sealing feature being positioned proximate to the at least a portion of the second end region configured to be biased into the second recess; and
    at least one depression formed in at least one of the outer surface and the inner surface of the substantially annular body, wherein at least a portion of the at least one depression is sized, located and configured to lie over the at least one recess to provide increased lateral flexure for the biasing of the at least a portion of the first end region into the at least one recess, the at least one depression positioned proximate to the at least one sealing feature, the at least one depression including a first depression and a second depression, each depression formed in the outer surface of the substantially annular body, wherein the first depression is positioned proximate to the first sealing feature and the second depression is positioned proximate to the second sealing feature.

2. The sleeve element of claim 1, wherein the at least one sealing feature includes a surface protruding radially in a second direction, opposite the first direction, beyond a radial extent of the bearing surface.

3. The sleeve element of claim 1, wherein the substantially annular body comprises a material selected from the group consisting of polyamide, polytetrafluoroethelene (PTFE), acetal, polyethylene, and polyurethane.

4. The sleeve element of claim 1, wherein the substantially annular body is sized and configured to interferingly engage the piston element surface with the inner surface of the substantially annular body.

5. The sleeve element of claim 1, wherein the substantially annular body is formed of a material providing at least one of resilient elongation and resilient compression of about 2% or more.

6. The sleeve element of claim 1, wherein the substantially annular body is configured as a continuous ring.

7. A seal assembly for sealing between a piston element and a bore surface disposed thereabout comprising:
    a piston element having a surface;
    a sleeve element positioned between the piston element surface and a bore surface disposed thereabout, the sleeve element having an inner surface, an outer surface, a first end region, and a second end region, wherein the sleeve element is configured as a continuous substantially annular ring;
    a first recess formed in the piston element surface; and
    at least one depression formed in at least one of the outer surface and the inner surface of the sleeve element, at least a portion of the at least one depression being sized, located and configured to lie over the first recess;
    wherein at least a portion of the first end region of the sleeve element is laterally adjacent to the first recess and configured to be biased laterally thereinto; and
    a first energizer positioned generally within the first recess, the first energizer configured to contact at least a portion of the inner surface of the sleeve element;
    wherein the sleeve element includes a first sealing feature extending from the outer surface thereof, proximate to the at least a portion of the first end region configured to be biased laterally into the first recess, the first sealing feature configured to sealingly engage against the bore surface.

8. The seal assembly of claim 7, wherein the sleeve element comprises a material selected from the group consisting of polyamide, polytetrafluoroethelene (PTFE), acetal, polyethylene, and polyurethane.

9. The seal assembly of claim 7, wherein the sleeve element comprises a material providing at least one of resilient elongation and resilient compression of about 2% or more.

10. The seal assembly of claim 7, wherein the inner surface of the sleeve element fits interferingly against the surface of the piston element.

11. The seal assembly of claim 7, further comprising:
    a first retention flange formed in the piston element surface and adjacent to the first end region of the sleeve element, the first retention flange exhibiting a lateral extent that exceeds a lateral extent of the inner surface of the sleeve element; and
    a second retention flange formed in the piston element surface and adjacent to the second end region of the sleeve element, the second retention flange exhibiting a lateral extent that exceeds a lateral extent of the inner surface of the sleeve element.

12. The seal assembly of claim 7,
wherein the at least a portion of the first end region of the sleeve element configured to be biased inwardly into the laterally adjacent first recess is configured to be biased in response to contact between the first sealing feature of the sleeve element and the bore surface.

13. The seal assembly of claim 7, further comprising:
a second recess, wherein the second recess is formed in the piston element surface;
wherein at least a portion of the second end region of the sleeve element is laterally adjacent to the second recess and configured to be biased laterally thereinto;
wherein the sleeve element includes a second sealing feature proximate to the at least a portion of the second end region configured to be biased laterally into the second recess, the second sealing feature configured to sealingly engage against the bore surface.

14. The seal assembly of claim 13, further comprising:
a first retention flange formed in the piston element surface and adjacent to the first end region of the sleeve element, the first retention flange exhibiting a lateral extent that exceeds a lateral extent of the inner surface of the sleeve element; and
a second retention flange formed in the piston element surface and adjacent to the second end region of the sleeve element, the second retention flange exhibiting a lateral extent that exceeds a lateral extent of the inner surface of the sleeve element.

15. The seal assembly of claim 14,
wherein the at least a portion of the first end region of the sleeve element configured to be biased inwardly into the laterally adjacent first recess is configured to be biased in response to contact between the first sealing feature of the sleeve element and the bore surface, the first recess formed in the piston element surface; and
wherein the portion of the second end region of the sleeve element configured to be biased inwardly into the laterally adjacent second recess is configured to be biased in response to contact between the second sealing feature of the sleeve element and the bore surface, the second recess formed in the piston element surface.

16. The seal assembly of claim 13, further comprising a second energizer positioned generally within the second recess, the second energizer configured to contact at least a portion of the inner surface of the sleeve element.

17. The seal assembly of claim 16, wherein the first and second energizer each comprise a material selected from the group consisiting of a thermoplastic elastomer and a thermoset elastomer.

18. The seal assembly of claim 16, further comprising:
a pressure relief structure designed to allow pressurized fluid or gas acting on at least one of the inner surface and the outer surface of the sleeve element to move past at least one of the first and second energizers.

19. The seal assembly of claim 18, wherein at least the first recess and the first energizer are mutually sized and configured to allow flow about the first energizer when the first energizer occupies a first range of positions generally within the first recess and prevent flow thereabout when the first energizer occupies a second range of positions generally within the first recess.

20. The seal assembly of claim 18, wherein the pressure relief structure comprises at least one protrusion or at least one groove formed on a surface of at least one of the first and second energizers.

21. The seal assembly of claim 13, wherein the sleeve element, the first recess, and the second recess are each sized and configured to promote a selected amount of deflection of the first end region of the sleeve element into the first recess and a selected amount of deflection of the second end region of the sleeve element into the second recess.

22. The seal assembly of claim 7, further comprising a pressure equalizing structure configured to allow pressure communication between the inner surface of the sleeve element and the outer surface thereof.

23. The seal assembly of claim 22, wherein the pressure equalizing structure comprises at least one aperture extending between the inner surface of the sleeve element and the outer surface thereof.

24. A method of forming a seal between a bore surface and a piston element surface, the method comprising:
providing a piston element having a surface;
providing a bore having a surface;
providing a sleeve element having an inner surface, an outer surface, an end region, and a sealing feature disposed generally within the end region;
providing a depression in at least one of the inner surface and the outer surface of the sleeve element;
providing a recess formed in one of the bore surface and the piston element surface;
disposing an energizer in the recess;
disposing the sleeve element between the piston element and the bore surface such that at least a majority of the sleeve element is external to the recess, wherein disposing the sleeve element between the piston element and the bore surface includes positioning at least a portion of the depression over the recess; and
biasing at least a portion of the end region of the sleeve element into the recess and contacting a surface of the at least a portion of the end region with the energizer.

25. The method of claim 24, wherein disposing the sleeve element between the piston element and the bore surface comprises compressing the sleeve element to reduce the size of an exterior surface thereof and disposing the sleeve element within the bore surface.

26. The method of claim 24, wherein contacting a surface of the at least a portion of the end region with the energizer further includes resiliently supporting the at least a portion of the end region of the sleeve element generally opposite to biasing thereof into the recess.

27. The method of claim 24, further comprising selectively relieving pressure acting on at least one of the inner surface and the outer surface of the sleeve element.

28. The method of claim 24, further comprising equalizing a pressure acting on the inner surface of the sleeve element and a pressure acting on the outer surface of the sleeve element.

29. The method of claim 24, wherein biasing at least a portion of the end region comprises biasing at least a portion of the end region into a recess formed in the piston element surface by sealingly engaging the bore surface against the sealing feature of the sleeve element.

30. The method of claim 24, wherein biasing at least a portion of the end region comprises biasing at least a portion of the end region into a recess formed in the bore surface by sealingly engaging the piston element surface against the sealing feature of the sleeve element.

31. A sleeve element for sealing between a piston element surface and a bore surface disposed thereabout comprising:
a substantially annular body including an inner surface, an outer surface, a first end region, and a second end region, the substantially annular body sized and configured to interferingly engage the piston element surface with the inner surface of the substantially annular body and maintain circumferential contact therebetween, wherein at least a portion of the outer surface is configured as a bearing surface;
wherein at least a portion of the first end region of the substantially annular body is configured to be biased laterally into at least one recess formed in the piston element surface;
at least one sealing feature formed on the substantially annular body proximate to the at least a portion of the first end region and longitudinally spaced from the bearing surface, the at least one sealing feature including a first sealing feature configured to be biased laterally into a laterally adjacent first recess of the at least one recess formed in the piston element surface in response to contact between the first sealing feature of the substantially annular body and the bore surface, the at least one sealing feature being sized and configured to sealingly engage against the bore surface; and
at least one depression formed in at least one of the outer surface and the inner surface of the substantially annular body, wherein at least a portion of the at least one depression is sized, located and configured to lie over the at least one recess to provide increased lateral flexure for the biasing of the at least a portion of the first end region into the at least one recess and wherein the at least one depression is longitudinally disposed between the at least one sealing feature and the bearing surface.

32. The sleeve element of claim 31, wherein the at least one sealing feature includes a surface protruding radially beyond a radial extent of the bearing surface.

33. The sleeve element of claim 31, wherein the substantially annular body comprises a material selected from the group consisting of polyamide, polytetrafluoroethelene (PTFE), acetal, polyethylene, and polyurethane.

34. The sleeve element of claim 31, wherein the substantially annular body is formed of a material providing at least one of resilient elongation and resilient compression of about 2% or more.

35. The sleeve element of claim 31, wherein:
the at least one sealing feature further comprises a second sealing feature;
at least a portion of the second end region of the substantially annular body is configured to be biased laterally into a laterally adjacent second recess formed in the piston element surface in response to contact between the second sealing feature of the substantially annular body and the bore surface; and
the second sealing feature is positioned proximate to the at least a portion of the second end region configured to be biased laterally into the second recess.

36. The sleeve element of claim 35, wherein the at least one depression further comprises:
a first depression and a second depression, each depression formed in the outer surface of the substantially annular body;
wherein the first depression is positioned proximate to the first sealing feature and the second depression is positioned proximate to the second sealing feature.

37. The sleeve element of claim 31, wherein the substantially annular member is configured as a continuous ring.

38. A sleeve element for sealing between a piston element surface and a bore surface disposed thereabout comprising:
a substantially annular body including an inner surface, an outer surface, a first end region, and a second end region, wherein the substantially annular body is configured as a continuous ring, wherein at least a portion of at least one of the inner surface and the outer surface is configured as a bearing surface oriented to face at least one of the piston element surface and the bore surface, and wherein a portion of the other surface of the inner surface and the outer surface is sized and configured to maintain circumferential contact with the other of the piston element surface and the bore surface;
wherein at least a portion of the first end region of the substantially annular body is configured to be biased laterally in a first direction into at least one recess formed in one of the piston element surface and the bore surface;
at least one sealing feature formed on the substantially annular body proximate to the at least a portion of the first end region and longitudinally spaced from the bearing surface, the at least one sealing feature including a first sealing feature configured to be biased laterally into a laterally adjacent first recess of the at least one recess formed in the piston element surface in response to contact between the first sealing feature of the substantially annular body and the bore surface, the at least one sealing feature sized and configured to sealingly engage against the same surface that the bearing surface is oriented to face; and
at least one depression formed in at least one of the outer surface and the inner surface of the substantially annular body, wherein at least a portion of the at least one depression is sized, located and configured to lie over the at least one recess to provide increased lateral flexure for the biasing of the at least a portion of the first end region into the at least one recess.

39. The sleeve element of claim 38, wherein at least one sealing feature includes a surface protruding radially in a second direction, opposite the first direction, beyond a radial extent of the bearing surface.

40. The sleeve element of claim 38, wherein the substantially annular body comprises a material selected from the group consisting of polyamide, polytetrafluoroethelene (PTFE), acetal, polyethylene, and polyurethane.

41. The sleeve element of claim 38, wherein the substantially annular body is formed of a material providing at least one of resilient elongation and resilient compression of about 2% or more.

42. A seal assembly for sealing between a piston element and a bore surface disposed thereabout comprising:
a piston element having a surface;
a sleeve element positioned between the piston element surface and a bore surface disposed thereabout, the sleeve element having an inner surface, an outer surface, a first end region, and a second end region;
a first recess formed in the piston element surface; and
at least one depression formed in at least one of the outer surface and the inner surface of the sleeve element, at least a portion of the at least one depression being sized, located and configured to lie over the first recess;
wherein at least a portion of the first end region of the sleeve element is laterally adjacent to the first recess and configured to be biased laterally thereinto;

wherein the sleeve element includes a first sealing feature extending from the outer surface thereof, proximate to the at least a portion of the first end region configured to be biased laterally into the first recess, the first sealing feature configured to sealingly engage against the bore surface;

a second recess, wherein the second recess is formed in the piston element surface;

wherein at least a portion of the second end region of the sleeve element is laterally adjacent to the second recess and configured to be biased laterally thereinto;

wherein the sleeve element includes a second sealing feature proximate to the at least a portion of the second end region configured to be biased laterally into the second recess, the second sealing feature configured to sealingly engage against the bore surface;

a first energizer positioned generally within the first recess, the first energizer configured to contact at least a portion of the inner surface of the sleeve element; and a second energizer positioned generally within the second recess, the second energizer configured to contact at least a portion of the inner surface of the sleeve element.

43. The seal assembly of claim 42, wherein the sleeve element comprises a material selected from the group consisting of polyamide, polytetrafluoroethelene (PTFE), acetal, polyethylene, and polyurethane.

44. The seal assembly of claim 42, wherein at least a portion of the outer surface of the sleeve element is configured as a bearing surface.

45. The seal assembly of claim 44, wherein the bearing surface of the sleeve element is sized and configured to conformally engage the bore surface.

46. The seal assembly of claim 42, wherein the sleeve element comprises a material providing at least one of resilient elongation and resilient compression of about 2% or more.

47. The seal assembly of claim 42, wherein the inner surface of the sleeve element fits interferingly against the surface of the piston element.

48. The seal assembly of claim 42, further comprising:
a first retention flange formed in the piston element surface and adjacent to the first end region of the sleeve element, the first retention flange exhibiting a lateral extent that exceeds a lateral extent of the inner surface of the sleeve element; and
a second retention flange formed in the piston element surface and adjacent to the second end region of the sleeve element, the second retention flange exhibiting a lateral extent that exceeds a lateral extent of the inner surface of the sleeve element.

49. The seal assembly of claim 42,
wherein the at least a portion of the first end region of the sleeve element configured to be biased inwardly into the laterally adjacent first recess is configured to be biased in response to contact between the first sealing feature of the sleeve element and the bore surface.

50. The seal assembly of claim 42,
wherein the at least a portion of the first end region of the sleeve element configured to be biased inwardly into the laterally adjacent first recess is configured to be biased in response to contact between the first sealing feature of the sleeve element and the bore surface; and
wherein the portion of the second end region of the sleeve element configured to be biased inwardly into the laterally adjacent second recess is configured to be biased in response to contact between the second sealing feature of the sleeve element and the bore surface.

51. The seal assembly of claim 42, further comprising:
a third recess formed in the piston element surface, the third recess disposed axially between the first and second recesses; and
an energizer positioned generally within the third recess, the energizer configured to contact the inner surface of the sleeve element.

52. The seal assembly of claim 42, wherein the first and second energizers each comprise a material selected from the group consisting of a thermoplastic elastomer and a thermoset elastomer.

53. The seal assembly of claim 42, further comprising:
a pressure relief structure designed to allow pressurized fluid or gas acting on at least one of the inner surface and the outer surface of the sleeve element to move past at least one of the first and second energizers.

54. The seal assembly of claim 53, wherein at least the first recess and the first energizer are mutually sized and configured to allow flow about the first energizer when the first energizer occupies a first range of positions generally within the first recess and prevent flow thereabout when the first energizer occupies a second range of positions generally within the first recess.

55. The seal assembly of claim 53, wherein the pressure relief structure comprises at least one protrusion or at least one groove formed on a surface of at least one of the first and second energizers.

56. The seal assembly of claim 42, further comprising a pressure equalizing structure configured to allow pressure communication between the inner surface of the sleeve element and the outer surface thereof.

57. The seal assembly of claim 56, wherein the pressure equalizing structure comprises at least one aperture extending between the inner surface of the sleeve element and the outer surface thereof.

58. The seal assembly of claim 42, wherein the sleeve element, the first recess, and the second recess are each sized and configured to promote a selected amount of deflection of the first end region of the sleeve element into the first recess and a selected amount of deflection of the second end region of the sleeve element into the second recess.

* * * * *

UNITED STATES PATENT AND TRADEMARK OFFICE
CERTIFICATE OF CORRECTION

| | | |
|---|---|---|
| PATENT NO. | : 7,370,866 B2 | |
| APPLICATION NO. | : 10/757774 | |
| DATED | : May 13, 2008 | |
| INVENTOR(S) | : Daniel K. Zitting and Lorin K. Zitting | |

It is certified that error appears in the above-identified patent and that said Letters Patent is hereby corrected as shown below:

In the specification:

| | | |
|---|---|---|
| COLUMN 6, | LINES 66-67, | change "surface" to --surface 31-- |
| COLUMN 12, | LINE 65, | change ")see FIG. 2A)" to --(see FIG. 2A)-- |

Signed and Sealed this
Twenty-sixth Day of February, 2013

Teresa Stanek Rea
*Acting Director of the United States Patent and Trademark Office*